United States Patent
More et al.

(10) Patent No.: US 8,607,036 B2
(45) Date of Patent: Dec. 10, 2013

(54) POWER MANAGEMENT APPARATUS AND METHODS

(75) Inventors: Grant M. More, Edinburgh (GB); Holger Haiplik, Swindon (GB); Abhay Kejriwal, Swindon (GB)

(73) Assignee: Wolfson Microelectronics plc, Edinburgh (GB)

( * ) Notice: Subject to any disclaimer, the term of this patent is extended or adjusted under 35 U.S.C. 154(b) by 477 days.

(21) Appl. No.: 12/841,591

(22) Filed: Jul. 22, 2010

(65) Prior Publication Data

US 2011/0022826 A1  Jan. 27, 2011

Related U.S. Application Data

(60) Provisional application No. 61/227,969, filed on Jul. 23, 2009.

(30) Foreign Application Priority Data

Jul. 22, 2009 (GB) .................................. 0912757.2

(51) Int. Cl.
*G06F 9/24* (2006.01)
*G06F 15/177* (2006.01)

(52) U.S. Cl.
USPC .................................................. 713/1; 713/2

(58) Field of Classification Search
USPC ........................................................ 713/1, 2
See application file for complete search history.

(56) References Cited

U.S. PATENT DOCUMENTS

| | | | |
|---|---|---|---|
| 6,035,395 A | | 3/2000 | Saito |
| 6,105,097 A | * | 8/2000 | Larky et al. ................... 710/314 |
| 6,543,008 B1 | | 4/2003 | Ninomiya |
| 6,925,554 B1 | | 8/2005 | Wright et al. |
| 8,046,571 B1 | * | 10/2011 | Feng et al. ......................... 713/2 |
| 2003/0037266 A1 | | 2/2003 | Karpel et al. |
| 2003/0229752 A1 | | 12/2003 | Venkiteswaran |
| 2004/0266454 A1 | * | 12/2004 | Nielsen et al. ............. 455/456.1 |
| 2007/0028084 A1 | * | 2/2007 | Yu et al. ............................ 713/1 |
| 2007/0061559 A1 | * | 3/2007 | Kwon et al. ....................... 713/1 |
| 2008/0002236 A1 | * | 1/2008 | Inaba ............................. 358/471 |
| 2008/0104386 A1 | | 5/2008 | Van Rooyen |
| 2008/0294838 A1 | * | 11/2008 | Houston et al. ............... 711/103 |
| 2009/0063843 A1 | | 3/2009 | Chieng et al. |
| 2009/0172384 A1 | * | 7/2009 | Anson ............................... 713/2 |

* cited by examiner

*Primary Examiner* — Vincent Tran
(74) *Attorney, Agent, or Firm* — Dickstein Shapiro LLP

(57) ABSTRACT

Apparatus and method for power management and especially to power management integrated circuits (PMICs). In one aspect, the invention relates to a PMIC having an internal non-volatile memory (NVM) for storing boot settings for the PMIC. The PMIC also has control circuitry for detecting whether a source of boot settings is available, such as an NVM external to the PMIC, and, if so, using any settings stored in the external source in preference to the relevant settings stored in the internal NVM. The external settings can thus override any internal settings, which is useful for fault diagnosis and/or development. In one aspect the PMIC may have programming circuitry for automatically programming boot settings from an external source into the internal NVM.

30 Claims, 6 Drawing Sheets

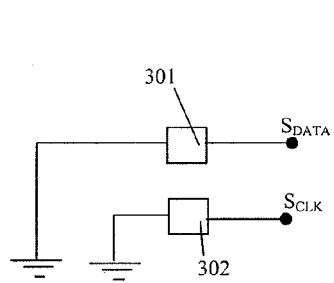
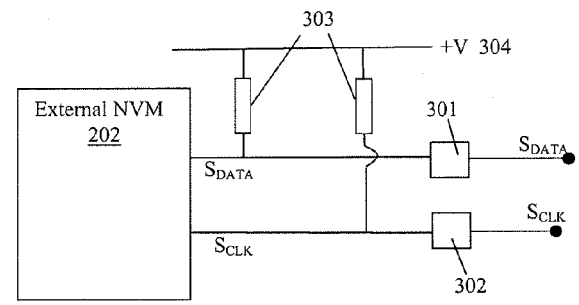
Figure 3a                Figure 3b
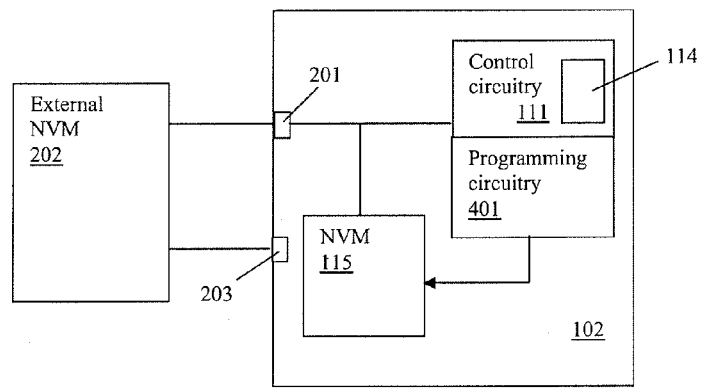
Figure 4
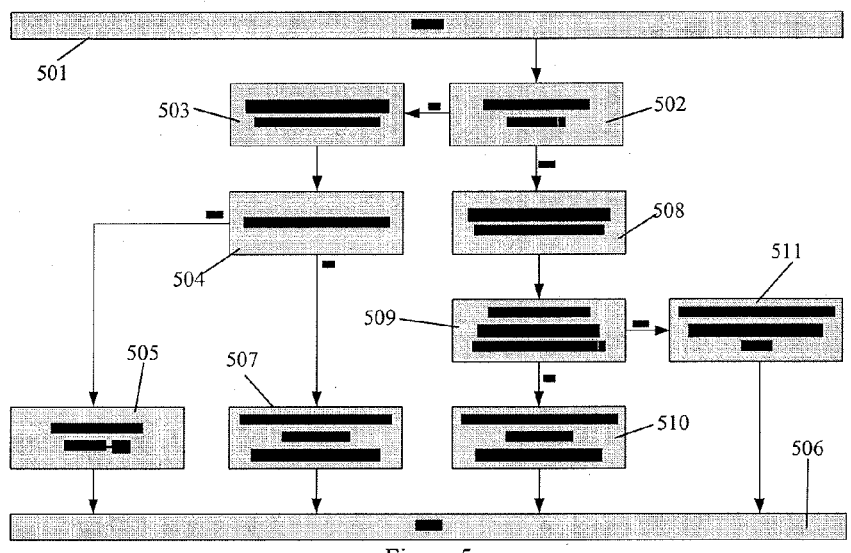
Figure 5

POWER MANAGEMENT APPARATUS AND METHODS

This application claims the benefit of U.S. Provisional Application No. 61/227,969, filed Jul. 23, 2009.

BACKGROUND OF THE INVENTION

1. Field of the Invention

This invention relates to the field of power management and power management apparatus, in particular power management integrated circuits, for supplying and regulating power to electrical devices, in particular to portable electrical devices.

2. Description of the Related Art

Many electrical devices include some sort of power management functionality. A power management unit, which is typically an integrated circuit, is typically arranged to receive power from a power supply, which may be one of a plurality of possible power supplies, and provide appropriately controlled and regulated power to one or more power domains within an electrical device in response to the power requirements thereof. As used in this specification the term "device" is taken to refer to an electrical product, such as a mobile telephone, personal computer, media player or the like whether portable or not or any other battery operated device.

Various device functions, i.e. device sub-systems, may be separately powered and form separate power domains within the device. Power domains may also exist where different sub-systems within the device operate at different voltages. A power domain therefore comprises one or more device sub-systems which receive a common power supply. Different power domains may be powered independently of one another and/or supplied with different voltages to one another.

The power management unit is therefore typically arranged with a plurality of power blocks, each power block being mapped and connected to a particular power domain to control and regulate the power supply thereto. As used herein the term "power block" refers to circuitry for providing an appropriate power supply to an individual power domain. The power blocks, which typically comprise some sort of voltage regulator (e.g. a linear regulator, a switch-mode converter using an inductance or a charge pump or any combination thereof) or power switch, are typically arranged with various configuration settings that allow parametric control of the power blocks. For example the output voltage, current limits and modes of operation can be specified by appropriate control of the configuration settings.

Typically the configuration settings are held in a store, such as a plurality of registers, in the power management unit in operation. The settings can be updated in use by the control circuitry of the power management apparatus to reflect any necessary changes occurring through use of the device, e.g. the voltage level supplied by the power management unit to a power domain of the device can be altered as necessary in response to a suitable command/control signal. Conveniently, an operating system of the device is arranged to determine the power requirements of the device and send appropriate control/command signals to the power management unit.

It will be appreciated however that the device operating system needs to be operational to control the power management unit. During start-up of the device operating system itself the power management unit has to use default configuration settings to configure the power blocks in order that the device can start to operate correctly. This start-up process is commonly referred to as a bootstrapping or boot procedure and the settings used in starting the device are referred to as boot settings.

The boot settings need to be available to the power management unit in start-up from an initial condition where any control registers or the like have been unpowered and hence do not hold any data.

Most devices with power management units are therefore provided with a non-volatile memory (NVM) arrangement for providing the boot settings for the power management unit.

The boot settings may comprise settings which determine which power blocks are enabled in a boot sequence and what the output voltage of each active power block is. The boot settings may also set the operating mode of the power block and/or a current limit or the output current of a current source or any other configurable property of the power block. The boot settings may also comprise settings indicating a sequence in which the power blocks should be enabled. The boot settings may also include various settings for configuring the power management integrated circuit (PMIC) itself. For instance the PMIC may be provided with various pins that may be used for different purposes in different device designs, for example a main power control button of the device may be assigned to a general purpose pin of the PMIC and the boot settings may configure the function of the general purpose pins such that the PMIC recognises a signal on the appropriate pin as a power state transition command.

In some devices it can be beneficial to start-up various device sub-systems in a predetermined order. At least some of the power domains of the device may be connected to one another, i.e. signals may be transmitted by circuitry in one power domain to circuitry in another power domain, possibly via level shifting circuitry. Depending on the various circuits forming the power domains there may be a need to power some domains before others to prevent a corrupted boot process or even damage to the device as a result of consequent signal misinterpretation.

Power management units may therefore be provided with a sequencer for activating and deactivating the power blocks which supply the various power domains within the device in a predetermined sequence. This predetermined sequence can be stored in the NVM as part of the boot settings.

Typically power management units are formed as integrated circuits and the NVM is formed integrally within the power management integrated circuit. The NVM may be provided in the form of hard-wired register defaults or a read only memory (ROM) arrangement that is fixed at the time of manufacture of the power management unit. Alternatively integrated NVM may be One Time Programmable (OTP) NVM, i.e. memory that can be written to or programmed only once and, once programmed, can not be readily altered. Alternatively integrated NVM may be reprogrammable NVM such as EEPROM or Flash memory. Use of OTP or reprogrammable NVM rather than a hard-wired or read only type of memory arrangement allows for the same design of power management unit to be programmed in different ways to suit different applications. It also means that the power management unit can be manufactured without needing to know the relevant boot settings for the device it will be used in as it can later be programmed with the appropriate boot settings for the particular device it will be used in.

The use of OTP NVM allows the boot settings for the power management unit to be programmed and retained for use in a cold start-up or boot sequence. However, the boot settings loaded into OTP NVM can't readily be changed once programmed into the NVM. During normal device operation there should be no need to update the boot settings and use of OTP NVM is convenient.

However, occasionally a device may develop errors which lead to a problem with the normal boot sequence. This may result in the device being unable to complete the boot sequence and therefore being unable to correctly start the operating system of the device. If the device operating system can not be started it may not be possible to run any internal diagnostic or repair routines. The boot settings, being stored in OTP NVM, can't be readily changed and hence the start up configuration can't be altered. Thus it can be very difficult to debug the device.

Also during device development it may be wished to try a variety of different boot settings. Using power management units having internal OTP NVM this would require a number of different test devices to be produced, each having a different power management unit with an appropriately programmed NVM.

SUMMARY OF THE INVENTION

Thus according to a first aspect of the present invention there is provided a power management integrated circuit for managing power supply of a device comprising: an internal non-volatile memory for storing boot settings for the power management integrated circuit; a data interface for connecting to an external source of boot settings; and control circuitry adapted to, when boot settings are required by the power management integrated circuit: in the event that an external source of boot settings is operably connected to the data interface, to provide one or more boot settings from the external source of configuration settings in preference to any corresponding boot settings stored in the internal non-volatile memory; and in the event that no external source of boot settings is operably connected to the data interface to provide any boot settings stored in the internal non-volatile memory.

The power management integrated circuit (PMIC) of this aspect of the invention thus has an internal NVM for storing boot settings, i.e. a memory which is part of and integrated or co-packaged with the PMIC and which maintains any stored data without requiring any power. The PMIC also has a data interface for connecting to an external source of boot settings, i.e. a source of boot settings which is not part of the PMIC. Control circuitry is provided which is adapted such that, when boot settings are required by the PMIC, to provide at least some boot settings from the external source if it is operably connected and otherwise provide any available boot settings from the internal NVM.

This arrangement means that when boot settings are required the PMIC automatically utilizes the boot settings from an external source, if available, or otherwise utilizes any boot settings stored in the internal NVM. The PMIC may therefore be arranged to detect whether or not an external source of boot settings is available. If an external source of boot settings is available, the control circuitry provides those boot settings in preference to the corresponding boot settings stored in the internal memory. That is, if the external source of boot settings is connected the settings, or at least a subset of the settings, held in the external source for configuring a first power block say may be used in a boot process instead of any settings relating to the configuration of the first power block which are stored in the internal NVM.

This embodiment of the present invention therefore allows the PMIC to operate with either an internal, integrated memory, with the cost saving of use of internal memory, or with an external source of boot settings when required, with the advantage that the boot settings in the external source may be changed or reprogrammed.

It will be appreciated that the settings that may be stored in the internal NVM are boot settings to be used in the absence of any other boot settings and the settings stored in the external source may be alternative boot settings, i.e. boot settings to be used instead of those stored in the internal NVM. As mentioned above these boot settings will comprise configuration settings for configuring the PMIC during a start-up or boot process of the device. The boot settings may also comprise settings for configuring the power supply to the PMIC itself.

In some applications the boot settings may be required by the PMIC every time the device is switched on. In other applications however the boot settings may generally only be required when the PMIC itself, or at least the control circuitry of the PMIC is powered from a previously unpowered state.

The skilled person will appreciate that the device may have a number of operational states, for instance an On state where the device is operational, a stand-by or sleep state where certain aspects of the device are quiescent and an Off state where the majority of the device functions are inactive. These device operational states may be implemented by various PMIC power states. For instance a PMIC ON state may correspond to all necessary power blocks supplying power to the power domains of the device as necessary. A PMIC SLEEP state may involve fewer power blocks actually supplying power and/or the power blocks supplying reduced voltage etc. In a PMIC OFF state the majority of power blocks of the PMIC may be inactive. All of these power states correspond to PMIC power states where external power is available to the PMIC however and, depending on the nature of the PMIC, the PMIC control circuitry and control registers and the like may be powered in all of the ON, SLEEP and OFF states. Turning the device on may therefore comprise the PMIC transitioning from an OFF state to ON state (or SLEEP) state and activating various power blocks. However the PMIC control circuitry itself is usually powered in all these states.

There will also be a PMIC NO_POWER state where there is no power supply available to power the PMIC itself. In this state the PMIC control circuitry is unpowered and any data held in control registers and the like will be lost.

The boot settings may conveniently be loaded into a volatile memory of the PMIC. For example the PMIC may conveniently comprise a plurality of registers for, in use, storing boot settings. The control circuitry is adapted to load the appropriate registers with boot settings obtained from the external source if present, or internal NVM, when required. The boot settings may be required when the PMIC, or at least the registers and control circuitry of the PMIC, go from an unpowered to a powered state, for example from a PMIC NO-POWER state to an OFF state (assuming the PMIC itself is powered in the OFF state). As the PMIC is powered, the control circuitry is arranged to detect whether the external source is present or not and to load the appropriate boot settings into the registers. It will be noted that the boot settings are loaded into the registers at this time but some, i.e. a subset, may only actually be used to configure the PMIC during a device start-up process, i.e. when the power domains of the device become powered, for instance in a PMIC OFF to ON or OFF to SLEEP state transition—which may occur later.

The PMIC may be arranged to obtain boot settings necessary for the OFF to ON (or SLEEP) transition at the time of the OFF to ON transition. In other words, as mentioned, the PMIC may obtain, or be supplied with, the boot settings every time the device is turned on.

As mentioned, however, in some applications the PMIC may remain powered even when the device is in an off state (as long as there is a suitable power supply), i.e. in a PMIC OFF state, and thus any boot settings previously loaded may be maintained as long as the PMIC is powered. In this case boot settings may only be required by the control circuitry if the registers of PMIC become unpowered and lose the stored settings. The PMIC registers will lose power in a NO-POWER state, for instance if there is no external power and any internal battery is removed or exhausted. There may be other power states where the PMIC registers are unpowered and lose their contents. For instance there may be a BACK-UP state where only a minimal power domain, termed Alive power domain, which may or may not be on the PMIC, is powered by a secondary charge store but the PMIC registers are unpowered. Returning to a state where the PMIC is powered from a BACK-UP state will require boot settings to be obtained.

In all cases however the PMIC may be arranged to obtain boot settings from the internal NVM or the external source if present in response to a suitable reset command indicating that the contents of the registers should be reset.

It will further be noted that if the PMIC maintains the boot settings in the device off state (preferably PMIC OFF state) it is possible that the boot settings obtained from the external source or internal NVM may be used for an initial device start-up (e.g. transition to a PMIC ON state) and then altered by the device operating system when up and running. These altered boot settings held in the PMIC registers could then be maintained (for as long as the PMIC remains powered) and used for subsequent device start-up. In other words the altered boot settings would be maintained when the PMIC transitioned to an OFF state, as although the device operating system is deactivated the PMIC remains powered in the PMIC OFF state. Hence these altered boot settings could be used during a subsequent boot process where the PMIC transitions to the ON state.

It will be appreciated that the PMIC may be arranged to provide other power states. However the principle is that if the PMIC control circuitry and any control registers or the like remain powered in any given PMIC power state the PMIC may be arranged to use boot settings previously loaded (and possibly subsequently modified), whereas the boot settings may be loaded from internal NVM or an external source on transition from a state where the PMIC control circuitry and control registers were previously unpowered.

The internal NVM may be any arrangement for providing the boot settings. It may comprise a read only memory or programmable read only memory or may comprise metal-mask hardwired register defaults. The NVM may comprise a One Time Programmable (OTP) memory.

In the absence of an external source of boot settings the PMIC provides any boot settings from the suitably pre-programmed internal NVM as is conventional. Should an error subsequently occur with the effect that the device fails to boot, an external source of boot settings can be supplied and these boot settings used instead of those stored in the internal NVM, for example OTP NVM. The control circuitry may automatically detect the connection of the external source of boot settings and thus provide the boot settings from the external source. The boot settings stored in the external source may be designed to aid in debugging the device and may be varied as required. For instance the device could be booted using boot settings identical to those originally programmed into the internal NVM. If the device boots correctly this may indicate that the internal NVM has become corrupted. If the device still fails to boot correctly the boot settings could be changed to perform a partial boot sequence in order to identify when in the process an error occurs. The skilled person would be well aware of how to perform debugging or diagnosis and repair of a faulty device. This embodiment of the present invention allows such a process to be performed and thus allows different default configuration settings to those stored in the internal NVM to be used, despite the fact that the OTP memory for example is not readily reprogrammable.

The internal NVM may instead be reprogrammable NVM, for instance the NVM could be EEPROM flash memory or the like. Even if the internal memory is a reprogrammable memory it is noted that providing an interface to an external source of boot settings and automatically detecting the presence of such an external source offers a convenient way of testing different boot settings and may be easier than reprogramming the internal memory.

This embodiment of the present invention also allows the connection of an external source of boot settings for development purposes. Whether or not the internal NVM contains any suitable boot settings the PMIC will utilize boot settings provided from the external source when it is connected. As mentioned above this external source can be programmable and thus development tests and changes can be performed using the external source. Thus this embodiment of the present invention allows the developer to use exactly the same PMIC in the development phase as in the final design but with the external source of boot settings being connected for the development phase.

Further the ability to connect an external source of boot settings and have the PMIC utilize the external boot settings instead of the settings stored in the internal NVM extends the flexibility of use of the PMIC. A PMIC which has a non-reprogrammable internal NVM which has already been programmed for one particular device is typically restricted for use with that particular device and those particular settings. If subsequently it is wished to update those settings, for example to improve performance, rather than use an entirely new PMIC with different internal settings, an external source of updated boot settings, e.g. an external NVM, can instead be connected to the PMIC and used in the device. Similarly, if a PMIC has been produced and its internal NVM programmed for use with one particular device, it can if necessary be used in another device by connecting an external NVM to the PMIC with the necessary boot settings for the other device.

The external source of boot settings may be anything that can provide the necessary boot settings when required. Conveniently the external source of boot settings may be a reprogrammable memory and may be a reprogrammable non-volatile memory. For instance a device developer may use a programmable NVM as the external source in device development. For example the external source of boot settings could be an Electronically Erasable and Programmable Read Only Memory (EEPROM) or flash memory or the like. Someone carrying out device debugging may also use a programmable NVM although in this application the external source need not necessarily be non-volatile memory. A volatile memory could be used instead or a processor device could be arranged as the external source to provide the required boot settings via appropriate signal paths.

The control circuitry is conveniently arranged to detect whether or not an external source of boot settings is operably connected. There are many ways in which such detection could be achieved and the control circuitry could be arranged to perform some sort of handshaking with the external source. The external source could be arranged to assert a control signal which can be detected by the control circuitry as an indication that the external source is connected. The external memory may be detected as part of a bus initialisation protocol, where the PMIC control circuitry sets a particular voltage level on a signal line or transmits a particular voltage pulse or pulse sequence. An external source of boot settings, if connected may respond by a pull-up/down of a signal line, or transmission of a pulse or pulse sequence. For example, the PMIC may be arranged to transmit an expected address of an external memory that may be connected (defined in factory-programmed NVM area) and wait for the expected acknowledgement response for a while.

Alternatively the control circuitry may simply detect whether anything is connected to the data interface on the basis that only an operable external source of boot settings will be connected via the data interface. The data interface may have a particular structure, for instance a socket arrangement, such that connection via a suitable connector changes a property connected with the interface in a detectable way, for instance the connector, when in place, could complete a detection circuit or change a inductance, capacitance or resistance or any combination thereof of a detection circuit in a detectable way. The data interface may conveniently be a dedicated data interface for communicating with an external source of boot settings although in some embodiments the data interface may also be used for other data transfer or control purposes for the PMIC.

In one embodiment the control circuitry is arranged to detect whether or not the external source of boot settings is operably connected to the data interface by detecting the presence of pull-up resistors which are connected only when the external source is connected. As the skilled person will appreciate some communication protocols which may be suitable for obtaining the boot settings from the external source, such as the I²C™ communication protocol are drive low type communication protocols and use pull-up resistors to maintain a voltage high in the absence of signals. If the interface supports an I²C™ type communication protocol it will have at least a serial data line contact and a serial clock line contact. The necessary pull-up resistors can be provided externally to the power management apparatus, for instance as part of the external source or the communications link between the external source and power management apparatus or could be associated with the data interface and arranged to be connected only when a suitable connector to an external source is connected to the interface. In any case, when a suitable external source is connected (and the power rail to which the pull-up resistors are connected is powered) the presence of the pull-up resistors will lead to a high voltage being detectable on the signal lines of the data interface. The control circuitry may therefore detect whether or not the external source of default configuration settings is connected to the data interface by detecting a non zero voltage on at least one signal line of the data interface.

Of course many other arrangements exist for detecting the external connection, for instance detecting the presence of transistors, inductors, capacitors etc. Other communication protocols other than I²C™ are appropriate and may be used and serial buses having greater or fewer than two lines may be used. The detection of an external connection may involve detecting a signal low or a zero voltage, or may involve detecting a current flow etc. or any other electrical parameter. It may involve sending a request to a prospective external source and waiting for a response, and in case there is no response or after a time-out period it will be assumed that no external source is operably connected.

When the presence of an external source of boot settings is detected the control circuitry may provide the external settings in preference to any settings stored in the internal memory, in other words, when an external source of boot settings is connected those settings are utilized to the exclusion of any settings from the internal NVM. In one arrangement, on detection of the external source a select signal may be generated to disable or prevent communication with the internal memory. In effect the internal memory may be switched off whilst an external source remains connected. In another arrangement however the contents of the internal NVM may be read into a volatile memory in the PMIC, such as a series of registers, prior to reading in the boot settings from the external store. Reading the data from the external source may result in all data from the internal NVM being overwritten. Thus the final data stored in the volatile memory represent the settings provided to the PMIC and the settings from external source, having overwritten those obtained from the internal NVM, are provided in preference to those stored in the internal NVM. It will be noted that when the internal NVM comprises a set of hard-wired defaults for the registers, the data in the internal NVM is inherently read into the registers when the registers are powered.

In another embodiment however, when an external store of boot settings is connected, some boot settings are provided from the external NVM in preference to any corresponding settings stored in the internal NVM but some boot settings are provided from the internal NVM alone. In other words connecting an external source of boot settings may result in the PMIC utilizing some boot settings obtained from the external source in preference to the corresponding settings stored in the internal NVM but other boot settings may be provided from the internal NVM alone.

The internal NVM may comprise some data for identifying and configuring some aspects of the PMIC which are not typically stored in an external source. This data which is stored in the internal NVM may be loaded into registers in the PMIC which can not be overwritten by data obtained from the external source. This data might relate, for example, to factory settings such as calibration trim data for a voltage reference circuit. As described in a co-pending application GB0912691.3, this data might also relate to device addresses and configuration data address mapping when other die are co-packaged with the PMIC.

Additionally or alternatively some boot settings stored in the internal NVM for configuring the PMIC during a boot sequence may be arranged as protected settings that are utilized in preference to any corresponding settings in an external store. These protected boot settings may be identified, for example by a bit setting in the NVM which may be translated into registers of the PMIC to indicate that certain settings should not be replaced with settings obtained from the external source.

As mentioned above, allowing all boot settings concerned with device start-up to be obtained from an external source (if connected) offers total flexibility in configuration of the PMIC even if the internal NVM is not reprogrammable. However it does allow the possibility of a third party attempting to change the settings of the device by connecting their own external source of boot settings. It may therefore be desired to protect certain settings, for instance maximum voltages or starting voltage levels for the power blocks for certain critical device sub-systems to prevent such settings from being easily replaced.

In one arrangement the control circuitry is arranged to load any boot settings from the internal NVM into volatile memory in the PMIC such as a series of registers and, if an external source of boot settings is present, to subsequently load boot settings from the external NVM into the registers so as to overwrite only some of the boot settings loaded from the internal NVM. The settings loaded from the internal NVM may be provided with a protection setting indicating, when loaded into the registers of the PMIC, whether the relevant settings can be overwritten or not.

The skilled person will of course appreciate that if the PMIC is substantially unpowered the control circuitry for detecting whether or not an external source of configuration settings is present will be unpowered and hence no detection of whether an external source is connected can occur. However the boot settings will only be required when the PMIC is powered and hence the control circuitry is powered and thus the detection can occur.

The source of external boot settings may need to be powered if present in order for the control circuitry to obtain boot settings therefrom. In some embodiments the external source of boot settings may also need to be powered for the control circuitry to detect whether or not the external source is present. The external source of boot settings may be powered independently of the PMIC. For instance in a development environment or debugging situation the external source of boot settings may be provided with its own power source. In one embodiment however the PMIC is arranged to have a power supply for an external source of boot settings when connected. This power supply may be linked to the PMIC power supply such that an external source of boot settings, if connected to the relevant power supply, is always powered when the PMIC is powered. This ensures that the external source of boot settings is always available when required by the PMIC.

The datainterface is any interface arrangement that allows connection to an external source of boot settings. It may be a specific port or connection or simply anything that allows the PMIC to access the data of external source of boot settings. It may be an interface that is specifically provided just for interfacing with an external source of boot settings or the interface may also be used for sending or receiving other signals to or from the PMIC, i.e. an interface which is also provided for other reasons.

The interface may comprise one or more contacts, such as contact pads or pins, for connecting an external source of boot settings with signal lines on the power management apparatus. As mentioned above the signal lines may comprise I²C™ compatible signal lines, for example there may be a serial data signal line and a serial clock signal line. The control circuitry may be arranged to use an I²C™ communication protocol to obtain configuration settings from an external source if present. As the skilled person will appreciate I²C™ is a known communication protocol which can be used in a variety of applications and has been used for data transfer with volatile and non-volatile memories. However other communication protocols exist and can be used instead of, or in addition to, an I²C™ protocol, for example SPI, SLIMbus, USB or other protocols including 1 wire bus protocols or bus protocols with more than two signal lines.

As mentioned above the external source of boot settings could be used in situations where it is desired to use different settings to those stored in the internal NVM or where they are no boot settings stored in the internal NVM, i.e. the internal NVM has not been programmed with boot settings and the relevant parts of the internal NVM are blank.

The device can therefore be safely started even with a PMIC that has an internal NVM which has not been programmed with boot settings by connecting a suitably programmed external source to provide the boot settings. Starting the device with a PMIC having a blank internal NVM in the absence of an external source of boot settings could be undesirable in some applications. In one embodiment therefore the control circuitry is adapted to determine whether the internal NVM has been programmed with boot settings. If the relevant parts of the internal NVM are substantially unprogrammed, the control circuitry may be arranged to prevent a boot or start-up sequence from occurring. Thus the PMIC may be arranged such that, without any external source of boot settings being available, no boot or start-up sequence can be performed if the internal NVM has not been programmed with boot settings. The control circuitry may be arranged to interrogate the internal NVM to determine whether it has been programmed by looking at the status of a setting in the internal NVM. In one embodiment though the control circuitry loads the contents of the internal NVM into volatile memory such as registers in the PMIC and then looks for the status of some of the loaded settings which indicate whether the NVM has been programmed. If the setting indicates the NVM has been programmed the loaded settings can be used in a boot sequence. However if the setting indicates that the NVM has not been programmed the control circuitry prevents a boot sequence from occurring. It will be appreciated that, in some applications, various sections of the internal NVM may be programmed at different times. There may be a single setting used to indicate when the programming of the whole NVM has been finalised or distinct data sets in the internal NVM, e.g. defined pages of data in the internal NVM, may each have a setting indicated that the programming of the relevant section has been finalised. Where such a finalisation setting is used to indicate that the data has been finalised the NVM, or relevant section thereof, is considered as unprogrammed without a valid finalisation setting, even though some data may have been written to that section.

The control circuitry may also be arranged to perform a similar check on any settings loaded from the external source of boot settings.

As described in this aspect of the present invention the power management apparatus obtains boot settings from an external source, when present, and uses these settings to control the operation of the PMIC in a boot sequence, i.e. to identify which power blocks are operational and in what order they become active and to set the power output levels and limits for the power blocks. In one embodiment however the power management apparatus is adapted to use the boot settings from the external source to program the internal NVM. In this embodiment of the invention, when the internal NVM is unprogrammed, the PMIC may obtain boot settings from the external source which are to be replicated in the internal NVM and use those settings to program the NVM. This can avoid the need for a specialist and complex programming tool and can avoid the need for a specialist programming tool on a production line. This aspect of the invention also allows greater flexibility in when the PMIC internal NVM need be programmed. The PMIC may therefore include internal NVM programming circuitry for automatically programming the configuration settings obtained from the external source into the internal NVM in response to a programming trigger. This embodiment of the present invention therefore puts some of the intelligence needed to program its internal NVM into the power management apparatus itself. This has the advantage of greatly simplifying the steps taken by a device manufacturer to program the PMIC internal NVM.

The internal NVM programming circuitry automatically programs the boot settings from the external source into the internal NVM in response to a programming trigger. This programming trigger could be a signal generated by the power management apparatus, for example by the control circuitry, in response to an external command received by the PMIC. The programming trigger could comprise a particular pulse sequence or the like which must be received by the PMIC. Use of such a programming trigger reduces the chance of false activation of programming mode but does require the control circuitry and/or programming circuitry to be able to recognise the required pulse sequence. In one embodiment however the external source of boot settings indicates whether the settings obtained from the external source are to be used for programming the NVM. For example the external source may comprise a bit used to indicate whether or not the settings are to be used for programming. If the bit is in one state, say logic high, this indicates that the settings are to be used for programming the internal NVM—thus the programming bit being logic high comprises the programming trigger. If the bit is in the other state, e.g. logic low, that indicates that the settings are not for programming the internal NVM and should instead be used (or retained for use) to configure the PMIC in a boot sequence as described previously. Therefore the control circuitry may be arranged to obtain a programming setting from the external source of boot settings and the state of the programming setting comprises the program signal. Using the source of external boot settings to indicate whether or not the settings are intended for programming the internal NVM means that programming the internal NVM can be simply achieved by connecting an appropriately programmed memory to the data interface. The PMIC automatically obtains the boot settings from the external memory and also automatically detects from the external programming setting whether the boot settings are to be used for configuring the PMIC or for programming the internal NVM or both.

The programming circuitry may comprise a state machine for writing the data obtained from the external source to the internal NVM. Conveniently the boot settings and any other data to be programmed into the internal NVM are automatically loaded into registers in the PMIC when the PMIC is powered as described previously. Once loaded, and the programming trigger received, for instance by the status of a programming setting in the obtained data, the programming circuitry automatically writes the data to the internal NVM using voltage pulses of amplitude, width and duration as appropriate for the particular type of internal NVM. The skilled person will readily appreciate that NVM manufacturers provide detailed specifications on the addressing pulses needed to program their particular type of NVM and would be readily able to implement a state machine to effect the necessary programming steps.

As the skilled person will appreciate programming the NVM typically requires a relatively high voltage power supply. Such a supply may not normally be available in the device. The internal NVM programming circuitry therefore may comprise circuitry for supplying power including an appropriate high voltage rail generated at least partly using on-chip circuitry to the internal NVM for programming. In other embodiments however a programming voltage supply may be separately supplied for programming the internal NVM.

The boot settings stored in NVM are typically those settings which may need to be varied from one device implementation to another. The skilled person will appreciate that the same design of PMIC may be used in various different device implementations. For instance different models of a device with different functionality may use the same design of PMIC. The power requirements may vary from one model of device to another and thus may require quite different boot setting.

The boot settings that are programmed into the NVM are typically those to do with the operation of the power blocks. For instance, as described above, the NVM may contain settings indicating which power blocks are to be active in the various power states of the PMIC. The NVM may contain settings indicating the order in which power blocks are activated and deactivated in a transition between power states. The NVM may contain settings defining the output power levels of the power blocks in the various power states, for example the output voltage, and any voltage or current limits.

In some embodiments of the present invention, where the internal NVM is programmable, such as OTP memory or reprogrammable memory, the internal NVM may also be programmed to store settings regarding the power path management of the PMIC. The PMIC may have power path management circuitry for managing the various different power supplies that may be available. For instance a device may have various different possible power supplies such as an internal battery, a bulk power supply or a USB power supply. The power path management circuitry provides selection and supervision of the available power sources. For instance the power path management circuitry provides switching between available power sources, supervision of voltage levels and imposes any necessary limits on the power supplies such as current limiting.

In one embodiment of the present invention the boot settings stored in the internal NVM or obtained from the external source of boot settings comprise settings for the power path management circuitry for the PMIC. For instance the boot settings may comprise a USB current limit. The boot settings may also comprise battery charging thresholds. Usually such settings are stored as hard-wired register defaults. Allowing such settings to be stored in programmable NVM allows the device manufacturer the ability to configure these settings as required.

In general this aspect of the invention relates to a power management integrated circuit which is arranged with a first NVM for storing boot settings and is also arranged such that another NVM storing boot settings, a second NVM, can be operably connected. If the second NVM is present the PMIC can use at least some of the boot settings stored in the external NVM in preference to corresponding boot settings stored in the first NVM. The first NVM may be an NVM internal to the PMIC, i.e. an NVM which is integrated into the PMIC or co-packaged with the PMIC to form a power management unit. The second NVM may be an external NVM. The second NVM can be automatically detected when present when boot settings are required.

One embodiment of the invention generally provides a PMIC comprising: an internal memory for storing boor settings for said circuit; an interface for coupling to an external source of at least a subset of said boot settings; and circuitry adapted to provide at least one boot setting to the PMIC from said external source in preference to any corresponding boot setting stored in internal memory when said source is operably connected to said interface.

One embodiment of the invention provides a PMIC comprising: a memory for storing boot setting for said PMIC; an interface for coupling to an external source for providing at least a subset of said boot settings; and circuitry for determining if said external source is operably connected to said interface.

One embodiment of the invention provides a PMIC comprising a non-volatile memory for storing boot setting for said PMIC; an interface for coupling to an external source for providing, in response to a control signal; at least a subset of said boot settings; and control circuitry for determining if said external source is operably connected to said interface and controlling, by means of a control signal, said source to provide at least a subset of said boot settings in preference to any corresponding boot setting stored in said non-volatile memory.

Another embodiment of the invention provides a PMIC comprising an internal source capable of providing boot settings for said circuit; an interface capable of having an external source coupled to it, said external source capable of providing at least a subset of said boot settings; wherein the PMIC operably uses, during boot, said external source in preference to said internal source when said external source is connected to said interface.

Another embodiment of the invention provides a PMIC comprising: a memory for storing boot setting for said PMIC; an interface for coupling to an external source of at least a subset of said boot settings; and a terminal for indicating the coupling of said external source to said interface.

In a second aspect of the present invention there is provided a method of obtaining boot settings for a power management integrated circuit comprising an internal non-volatile memory, the method comprising the steps of:

determining whether an external source of boot settings is available to the power management apparatus, obtaining default settings from the external source of boot settings if said external source is available, obtaining any boot settings from the internal non-volatile memory if said external source is not available.

The method of this aspect of the invention offers the same benefits and advantages as described above in relation to the first aspect of the invention and can be implemented using any of the embodiments described above. In particular the step of determining whether an external source of boot settings is available may comprise the step of determining whether said external source is connected to a data interface of the PMIC.

The method may involve the step of determining whether the internal NVM has been programmed with boot settings and only utilizes the settings stored in the internal NVM if it has been programmed. In the event it is determined that the internal non-volatile memory has not been programmed with boot settings, the method may prevent the PMIC from performing a boot sequence for the device.

The method may involve loading the boot settings from the internal NVM or external source as appropriate into a volatile memory of the PMIC, such as registers. The method may involve loading the contents of the internal NVM into the volatile memory and subsequently, if an external source of boot settings is connected, overwriting at least some of the data in the registers with data obtained from the external source.

The method may be employed at any point at which boot settings are required by the power management apparatus. In particular a method of starting a device having a PMIC may involve obtaining boot settings according to this aspect of the invention when the PMIC becomes powered and using any configuration settings obtained to configure the power management apparatus in a device start-up process.

The method may comprise an initial step of, when desired to use external boot settings, connecting an external source of boot settings to the PMIC. The external source of boot settings may be any suitable source but conveniently is an external memory. The external memory may be a volatile or non-volatile memory and in one embodiment is a reprogrammable memory, i.e. a memory that can be updated many times. The external memory may, for instance, be an EEPROM or flash memory.

The method applies to a method of testing devices. A suitable external source of boot settings is connected to the PMIC and programmed with test boot settings. The programming may be performed before or after the external source is connected to the PMIC. The test boot settings may be any settings allowing the desired testing of the device. The testing may be for development purposes, in which case the internal NVM may be unprogrammed, or for debugging or repair purposes in which case the internal NVM may typically have been previously programmed. The testing may involve starting the device a plurality of times with different default configurations settings stored in the external source each time.

The method of the present invention therefore provides a convenient method of testing the power management of devices.

The method also applies to the programming of the internal NVM of a PMIC. The method may therefore comprise programming the internal non-volatile memory of a PMIC. A suitable external source of boot settings for programming into the internal NVM is connected to the data interface. The configuration settings obtained from the external source are used to program the internal non-volatile memory The method may comprise a method of operating a PMIC comprising the steps of, on activation of the PMIC: automatically performing the programming method if an external source of boot settings has a status setting indicating that the boot settings should be programmed into an internal non-volatile memory; or otherwise performing the start-up method, or both.

The ability to automatically program the internal NVM of a PMIC represents another aspect of the present invention.

Conventionally programming the internal NVM of a PMIC involves use of a complex programming tool. Device manufacturers might want to program the internal NVM themselves, rather than rely on the manufacturer of the power management apparatus and thus require their own programming tool.

The programming tool typically comprises a control system, an internal reprogrammable memory for storing the configuration settings to be programmed and a communications interface for communicating with the PMIC. In use the programming tool pushes the settings to be programmed into the PMIC and initiates a programming cycle to commit the settings to the internal NVM.

Requirements for NVM reliability, i.e. to ensure robust programming in terms of data retention and read margin, demand for example precise control of the application time of high-voltage programming pulses. This can mean that the programming tool is complex and expensive and must be configured by an expert and requires system level knowledge of both the target device and programmer tool to correctly set-up.

The same issues apply generally to any integrated circuits which include an internal NVM for storing some configuration settings for that integrated circuit.

Thus in a third aspect of the present invention there is provided an integrated circuit comprising: an internal non-volatile memory for storing configuration settings; and programming circuitry operable in a programming mode to obtain configuration settings from an external source and to automatically program said obtained configuration settings into the internal non-volatile memory.

The integrated circuit (IC) of this aspect of the invention includes programming circuitry and is capable of automatic self-programming of its internal NVM in a programming mode. This embodiment of the present invention thus acquires the configuration settings to be written to the NVM from the external source and uses them to program the NVM. No specialist programming tool is needed, only a suitable external source of configuration settings. Again the term "internal NVM" is used to mean NVM which is part of and integrated or co-packaged with the IC and an "external source" is taken to mean a source which is not part of or integrated with the IC, i.e. external to the IC. The IC may be a power management IC for managing power supply of a device. In which case the configuration settings stored in the internal NVM may be boot settings for configuring the IC during a start-up or boot sequence.

The programming circuitry is conveniently arranged to operate in the programming mode in response to a suitable program command instruction. The program command instruction may be received by the programming circuitry in a variety of different ways. An operator could generate a program command instruction at an appropriate time, for instance after the operator has arranged a suitable source of desired configuration settings to be connected to the IC. The program command instruction could be generated by sending a program command to the IC via a general control data interface of the IC or there could be a dedicated signal line for asserting a program command. The program command could be received directly by the programming circuitry or control circuitry of the IC may receive the command and issue the power command instruction to the programming circuitry. The programming command instruction could comprise a specified sequence of voltage pulses or the like with a sequence chosen so as to minimise the chance of false activation of programming mode. This does however required circuitry able to recognise the appropriate pulse sequence.

In a convenient embodiment however the program command instruction is issued by controlling a setting in the external source of configuration settings. For example a single bit may be used with one logic state being used to indicate that the configuration settings should be used to program the internal NVM and the other logic state indicating that the configuration settings should not be used to program the internal NVM. For example logic high could indicate that the settings are to be used for programming the NVM and detection of the relevant bit in a logic high state indicates a program command instruction has been received. Thus a program command instruction may comprise detecting a setting in the external source indicating that programming is required.

Conveniently the IC comprises circuitry adapted to detect whether or not an external source of default configuration settings is operably connected to the IC. In other words the IC can automatically detect whether or not an external source of configuration settings is available. The circuitry adapted to detect the presence or otherwise of an external source may be part of the programming circuitry and/or part of control circuitry of the IC or may comprise separate dedicated monitoring circuitry.

There are many ways in which such detection could be achieved. The circuitry for detecting the external source could be arranged to perform some sort of handshaking with the external source. The external source could be arranged to assert a control signal which can be detected as an indication that the external source is connected. The external memory may be detected as part of a bus initialisation protocol, where the PMIC control circuitry sets a particular voltage level on a signal line or transmits a particular voltage pulse or pulse sequence. An external source of boot settings, if connected may respond by a pull-up/down of a signal line, or transmission of a pulse or pulse sequence. For example, the PMIC may be arranged to transmit an expected address of an external memory that may be connected (defined in factory-programmed NVM area) and wait for the expected acknowledgement response for a while.

Alternatively the, IC may comprise a data interface for connecting an external source of configuration settings and the circuitry for detecting the external source may simply detect whether anything is connected to the data interface. Thus detection of a connection via the interface is taken as an indication of the connection of a source of external configuration settings. In this embodiment the data interface may have a particular structure, for instance a socket arrangement, such that connection via a suitable connector changes a property connected with the interface in a detectable way, for instance the connector, when in place, could complete a detection circuit or change an inductance, capacitance or resistance of a detection circuit in a detectable way.

In one embodiment the circuitry for detecting whether or not an external source of default configuration settings is operably connected to the data interface operates by detecting the presence of pull-up resistors which are connected only when the external source is connected. As the skilled person will appreciate some communication protocols which may be suitable for obtaining the configuration settings from the external source, such as the I$^2$C™ communication protocol are drive low type communication protocols and use pull-up resistors to maintain a voltage high in the absence of data. If the data interface supports an I$^2$C™ type communication protocol it will have at least a serial data line contact and a serial clock line contact. The necessary pull-up resistors can be provided externally to the power management apparatus, for instance as part of the external source or the communications link between the external source and power management apparatus or could be associated with the data interface and arranged to be connected only when a suitable connector to an external source is connected to the interface. In any case, when a suitable external source is connected (and the power rail to which the pull-up resistors are connected is powered) the presence of the pull-up resistors will lead to a high voltage being detectable on the signal lines of the data interface. The circuitry for detecting the external source may therefore detect whether or not the external source of default configuration settings is connected to the data interface by detecting a non zero voltage on at least one signal line of the data interface.

Of course many other arrangements exist for detecting the external connection, for instance detecting the presence of transistors, inductors, capacitors etc. Other communication protocols other than I$^2$C™ are appropriate and may be used and serial buses having greater or fewer than two lines may be used. The detection of an external connection may involve detecting a signal low or a zero voltage, or may involve detecting a current flow etc. or any other electrical parameter.

When the presence of an external source of default configuration settings is detected the IC may therefore be arranged to detect whether a setting in the external source indicates that programming is required. In other words the IC, such as a PMIC, may be arranged to automatically detect whether or not an external source of configuration settings is present and, when such a source is detected, automatically determine whether or not such settings are intended for programming the internal NVM. In the event that the settings are intended for programming the NVM the programming circuitry will therefore have received a program command instruction and will automatically enter programming mode.

In the event that an external source is connected and the program setting indicates that the configuration settings are not intended for programming the internal NVM the configuration settings may used as default configuration settings or boot settings when required, i.e. when the IC is powered and needs to be configured. For example if the IC is a PMIC used in a device the configuration settings may comprise boot settings to be used to configure the PMIC in a device start-up. If the PMIC is powered from a previously unpowered state and an external source of configuration settings not intended for programming the internal NVM is detected the configuration settings from the external source may be utilized to configure the PMIC as part of a start-up or boot sequence.

It should also be noted that if the IC is activated from an unpowered state and no external source of default configuration settings is detected the IC may obtain any configuration settings from the internal NVM. In other words, once the internal NVM has been suitably programmed and there is no external source of configuration settings connected, the IC loads the configuration settings from the internal NVM.

In response to a program instruction command, whether through detection of an appropriate setting in the external source or receipt of a specific command generated by a user, the programming circuitry operates in programming mode. In general the programming involves various steps. The programming steps are generally the same as those used in programming the NVM using the conventional programming tool, however it is the programming circuitry of the IC which automatically performs all the necessary steps rather than requiring a processor of an external programming tool to issue instructions. The programming circuitry acts autonomously, without user intervention, save perhaps applying a clock or power supply rail or such like, once programming mode has been initiated.

The programming circuitry may be arranged to check that the internal NVM is capable of being programmed prior to attempting to write any data to the NVM. As mentioned previously the internal NVM may be a one-time-programmable (OTP) NVM and thus, once a particular bit has been programmed once, this bit can not readily by reprogrammed. The programming circuitry may therefore be adapted to check whether or not the internal NVM is OTP NVM which has already been programmed. Typically when an OTP NVM is programmed a status setting is updated to indicate that the NVM has been programmed. The programming circuitry may therefore check for a status bit indicating that the internal OTP NVM has been previously programmed and, if the NVM has been previously programmed, terminate the programming routine. Thus a program command instruction may only result in programming of the internal NVM if the internal NVM is unprogrammed or is reprogrammable. OTP NVM may be programmable in separate sections and thus some sections may be programmed independently of another section. In this case the programming circuitry may check whether the relevant section has been programmed or not. Thus a section of OTP NVM which has not previously been programmed may be programmed even when a different section has already been programmed.

The programming circuitry may also be arranged to determine whether a suitable power source is available and to terminate the programming routine if no such power source is available. Writing to an NVM typically requires a relatively high voltage source.

Where the IC is a PMIC the programming circuitry may be adapted to transfer the PMIC to a PROGRAM power state on a valid program command instruction. The PROGRAM power state is a special power state of the PMIC that is used for programming the internal NVM. In the PROGRAM power state most power blocks of the PMIC may be inactive, apart from those powering the PMIC itself. Further a relatively high voltage supply (provided on-chip or off-chip) to the internal NVM may be enabled. The programming circuitry may adopt the PROGRAM state itself or may issue a power state request to control circuitry of the PMIC. Should a suitable high voltage power supply be unavailable the power state transition will not occur and the programming routine will be cancelled.

Assuming that the internal NVM is suitable for programming and the necessary power supply is available the programming circuitry is arranged to read data from the external source, possibly one page of data at a time, and to write the data to the internal NVM. Once the data has been written the programming circuitry may verify the data, for instance by performing one or more margin reads as is known in the art. If the margin reads indicate that the data has been written correctly the programming circuitry may finalise the data write by updating various status settings in the NVM.

The skilled person will appreciate that the conventional approach to programming internal NVMs typically makes use of data read, write, verify and finalise commands. For the conventional approach however the data must be written from the programmer tool to a register window in registers of the IC via a general control and command interface of the IC. The IC may typically be part of a wider device when the internal NVM is programmed and enabling the command and control interface can involve powering various parts of the device. Pushing the data to be programmed to the registers in the IC is therefore a relatively complex procedure. Once the data is held in the registers of the IC the programmer tool then issues the various instructions, again via the command and control interface, to transfer the data in the register window to the internal NVM, to perform the data integrity checks and to finalise the data. In this aspect of the present invention the data can be written from the external source to registers in the IC easily without requiring the command and control interface of the IC. Thus the wider device need not be active. Once stored in registers in the IC the programming circuitry writes the data to the internal NVM using the same sort of steps as the programming tool would. However in this aspect of the invention the programming takes place automatically without any user intervention once the programming circuitry is in programming mode.

Should any of the data integrity checks indicate an error in the written data the programming circuitry can set a status flag to indicate an error. An operator can then check, either at the end of the programming cycle or later, for any error status flags to check whether or not the programming was successful.

The programming circuitry may comprise a state machine for writing the data obtained from the external source to the internal NVM. Conveniently the configuration settings and any other data to be programmed into the internal NVM are automatically loaded into registers in the IC when the IC is powered as described previously. Once loaded, and the programming circuitry operated in programming mode, for instance by detecting the status of a programming setting in the obtained data, the programming circuitry writes the data to the internal NVM using voltage pulses of amplitude, width and duration as appropriate for the particular type of internal NVM. The skilled person will readily appreciate that NVM manufacturers provide detailed specifications on the addressing pulses needed to program their particular type of NVM and would be readily able to implement a state machine to effect the necessary programming steps.

The external source of configuration settings may be anything that can provide the necessary configuration settings when required. Conveniently the external source of configuration settings may be a reprogrammable memory and may be a reprogrammable non-volatile memory. For example the external source of default configuration settings could be an Electronically Erasable and Programmable Read Only Memory (EEPROM) or flash memory or the like. However a master OTP NVM memory could be used as well. A properly managed and maintained volatile memory could be used instead as an external source to provide the required configuration settings.

As mentioned above the IC may have a data interface to allow connection to an external source of configuration settings. The interface may comprise one or more contacts, such as contact pads or pins, for connecting an external source of configurations settings with signal lines on the power management apparatus. As mentioned above the signal lines may comprise I²C™ compatible signals lines, for example there may be a serial data signal line and a serial clock signal line. The power management apparatus may be arranged to use an I²C™ communication protocol to obtain the configuration settings from the external source. As the skilled person will appreciate I²C™ is a known communication protocol which can be used in a variety of applications and has been used for data transfer with volatile and non-volatile memories. However other communication protocols exist and can be used instead of, or in addition to, an I²C protocol, for example SPI, SLIMBus or USB.

This aspect of the invention therefore generally allows an IC, especially a PMIC, which is arranged in communication with a programmable NVM for storing configuration settings for the IC in use, for example boot settings, with circuitry for automatically programming of that programmable NVM with data obtained from an external store in response to a programming trigger. The detection of the programming trigger may also be automatic.

In one embodiment the invention provides an IC comprising: a non-volatile memory for storing configuration settings for that IC; an interface for coupling to an external source comprising at least one configuration setting; and circuitry operable to automatically acquire and store said at least one configuration setting within said non-volatile memory when said source is operably connected to said interface.

This embodiment of the present invention therefore allows an IC such as a PMIC to be programmed easily and simply without requiring use of a specialist programmer tool. In a fourth aspect of the invention there is provided a method of programming the internal non-volatile memory of an integrated circuit as described above with reference to the third aspect of the invention comprising the steps of connecting an external source of configuration settings to the integrated circuit and operating the programming circuitry in programming mode.

This method of the present invention therefore uses an integrated circuit, such as a power management IC, as described above in relation to the third aspect of the invention. All of the advantages and embodiments described in relation to the third aspect of the invention apply to the method of this aspect of the invention.

In particular the step of operating the programming circuitry in programming mode may comprise the step of configuring a setting in said external source to indicating that programming is required and activating the power management apparatus. The programming circuitry will then automatically detect the presence of configuration settings to be programmed into the internal NVM.

The external source of configuration settings may be a reprogrammable memory and may be a non-volatile memory. The external source of configuration settings may, for example, be EEPROM memory.

The programming circuitry may write the configuration settings directly from the external source to the internal non-volatile memory, i.e. not via a register map of the power management apparatus.

Once the internal NVM of a PMIC has been suitably programmed with default configuration settings, i.e. boot settings, the PMIC can be used in a device without requiring any external source of default configuration settings. Alternatively in some devices an external NVM may be used in the final device design to provide the default configuration settings. In either case, in use, a non-volatile memory is used to store the default configuration settings.

As mentioned above the default configuration settings stored in an NVM are typically those settings which may need to be varied from one device implementation to another, and typically include those to do with the operation of the power blocks. For instance the NVM may contain settings indicating which power blocks are to be active in the various power states of the device. The NVM may contain settings indicating the order in which power blocks are activated and deactivated in a transition between power states. The NVM may contain settings defining the output power levels of the power blocks in the various power states, for example the output voltage, and any voltage or current limits.

Typically however some default settings of the PMIC are effectively hard-wired into the power management apparatus and are not stored in a programmed NVM.

One such setting which is typically hard-wired is a USB current limit, i.e. a limit to the current the PMIC will take from a power supply input designed to be suitable for connection to a USB bus. It will be appreciated that some electrical devices may have a USB device-to-device interface. As is well known the USB interface may be used to provide power from a host device. The USB 2.0 standard specifies that a device receiving power via a USB connection should draw a current of 100 mA or less unless the device has negotiated with the host (i.e. the device supplying the power) for a greater supply current of up to 500 mA (where available). This allows the host to ensure that power is supplied safely and also, if necessary, to arbitrate between various competing devices. If a device attempts to draw a greater current before having negotiated a greater supply current the host may impose a current limit or may cease supplying power to that device.

It is conventional therefore for a PMIC which is capable of receiving a USB power supply to impose a hard-wired default current limit guaranteed to be less than 100 mA to the USB power supply. This prevents the PMIC from inadvertently drawing more current than allowed via the USB supply. In operation, i.e. when the operating system of the device is running, the USB current limit can be altered by the operating system instructing control circuitry of the PMIC to change the settings in an appropriate control register. Thus if the device processor say negotiates a higher current allowance from host it can then command the PMIC to update the configuration setting for the USB current threshold to allow a greater current.

With an increasing trend to devices having more functionality or greater processing power and the like, the start-up power requirements of several devices are increasing. Some devices may require a current of greater than 100 mA to correctly start-up, i.e. to transition from the PMIC OFF state (where power is available but most device power domains are unpowered) to a PMIC ON state (where several of the device power domains are powered and the operating system of the device is functional). This can cause a problem if the power supply being used is a USB supply. Although a device can negotiate for a greater current supply from the USB host, to do so the processor of the device and appropriate communication sub-systems need to be operational. If starting the processor and communication systems requires a current of greater than 100 mA then the processor can't be started without exceeding the current limit—but the current limit can't be exceeded unless the processor is operational. The result is that the device can't be started using a USB power supply alone.

This problem is further exacerbated by the fact that for some device sub-systems start-up currents may involve drawing currents that exceed normal operating currents. When power is supplied to a power domain of the device that has been unpowered, decoupling capacitors and the like may need to be charged. This can draw a significant current. For power domains supplied by a power block having a voltage regulator that, in normal operation, needs to be able to supply substantially more than 100 mA it can be very difficult to apply a current limit guaranteed to be less than 100 mA to the regulator. Even a device which draws less than 100 mA when operational may nevertheless require more than 100 mA during a start-up phase due to individual power domains generating current spikes during their respective start up.

Thus according to a sixth aspect of this invention there is provided a power management integrated circuit comprising: a USB power input for receiving power via a USB supply; and current limiting circuitry for imposing a current limit to the USB power; wherein the default USB current limit is arranged to be configured, in use, based on settings in a programmed non-volatile memory.

In this embodiment the default USB current limit, i.e. the boot USB limit which is used in the absence of any other available settings, is determined, in use, based on the settings in a programmed NVM. In other words the PMIC according to this aspect of the invention is arranged to set the default USB current limit based on the settings loaded into an NVM and not a hard-wired default imposed at the time of fabrication of the PMIC.

This means that the default USB current limit is configurable by appropriate programming of the relevant programmable NVM.

This allows a device manufacturer to choose a default configuration setting to set a default USB current limit which is appropriate for his device. Thus the same design of PMIC may be used in different devices with different default USB current limits by appropriate programming of the NVM.

The NVM may be internal to the PMIC, i.e. formed as part of, and integrated with the PMIC, or it may be external NVM, i.e. not part of the power management apparatus. Conveniently the default USB current limit is stored in an NVM that contains other boot settings for the PMIC.

The NVM may be reprogrammable NVM or may be NVM that can be programmed only once, for instance one-time-programmable (OTP) NVM. It will be appreciated that once the OTP NVP has been programmed with a default USB current limit setting that setting can not readily be reprogrammed and hence the default USB current limit setting is effectively fixed once programmed (unless the OTP NVM is external NVM which is later replaced or some other source of boot settings is connected and the settings contained therein utilized in preference to those of said OTP NVM). However it will be understood that the NVM may be programmed by the device manufacturer whereas a conventional hard-wired default is fabricated by the manufacturer of the PMIC The PMIC may therefore comprise circuitry for loading the default USB current limit settings from the non-volatile memory into appropriate control registers when required.

It will of course be appreciated that default USB current limit is used when there is no other setting information available and is typically used in a start-up or boot process of the PMIC where no other settings are available—however there may be situations such as a full reset or the like where any existing settings are effectively wiped and the default USB current limit used. Once the device operating system is running the USB current limit may be changed in operation.

Allowing the default USB current limit to be a setting that is programmed in an NVM allows the device manufacturer to set the current limit applied to a USB power supply. Thus a manufacturer of a device which will not exceed the 100 mA USB standard limit during start-up may choose to set the default USB current limit to 100 mA in line with the USB 2.0 specification (or a different limit in line with a future USB specification if released). However a manufacturer of a device with a start-up current that may exceed 100 mA may choose to set the default USB current limit correspondingly higher. A particular host device may however allow an unknown device to draw more than 100 mA without cutting off the power supply, and the customer device or recommended customer accessories of the device may contain such a host device. Thus the device manufacturer may choose to set the default USB current limit to 500 mA say. A current of 500 mA may be sufficient to allow the device processor and communication sub-systems to activate. A particular host may allow a device to draw a current of 500 mA for at least a short period without cutting the power supply. Thus configuring the USB default current limit to higher than 100 mA may be sufficient to ensure that the device will start up and device systems necessary to negotiate with the host for higher current if necessary can be activated correctly.

Another device manufacturer may choose to ignore the USB standard default limit altogether and may choose to set a current limit to the maximum current of 500 mA for example. Whilst the USB 2.0 standard suggests that a device should not draw more than 100 mA from a host without having negotiated a greater supply some devices having USB host capability, especially dedicated USB power hubs, can provide substantially more current than that. Thus increasingly USB host devices are available which are capable of supplying a current greater than 100 mA to a slave device without negotiation. This embodiment of the present invention allows a device manufacturer to choose to set a USB current limit which is significantly greater than the 100 mA limit.

For a device that requires a start-up current likely to significantly exceed 100 mA, imposing a default 100 mA USB current limit would in effect mean the device could not be started using a USB power supply. Were the default USB current limit set instead to 500 mA for example the device would attempt to draw as much current as needed to start-up. The device would still not start up if powered by a host device that would not or could not supply more than 100 mA but it would start up if powered by a USB power supply from a host device that does not impose a 100 mA limit and can supply the additional current required. Thus having the ability to set the default USB current limit allows such a device to be started under a greater range of power conditions.

Making the default USB current limit configurable, and providing a default configuration setting in NVM, goes against standard industry practice and allows a device manufacturer to bend or break the 100 mA current rule but can offer a greater flexibility in power operating conditions and allows the device manufacturer to choose what default they want.

The default USB current limit may be configurable to a variety of different current limits depending on the nature of the current limiting circuitry and the resolution of the setting in the NVM. As an example the USB current limit may be set to any of up to two, or four, or eight or sixteen different levels by configuring a setting in NVM of one, two, three or four bits respectively. One of the default USB current limits that may be selected may be at or around 100 mA (or whatever value of current limit may be specified in a future USB standard). The USB default current limit may be configurable to a current limit which is significantly greater than 100 mA for example around 2 A or so.

In addition to the USB default current limit being configurable by setting an appropriate setting in an NVM, the mode of operation of the PMIC before or during a start-up procedure may be configurable to allow a device manufacturer who chooses to use a relatively low default USB current limit to configure the PMIC to operate in accordance with the chosen limit.

In a conventional start-up of the power domains of a device the power blocks supplying those domains are enabled, possibly at the appropriate point in a boot sequence. The power block may have a current limit setting but this setting may be arranged at the operating current limit setting. As mentioned during start up of a power domain the need to charge decoupling capacitors and the like may result in current spikes and the current drawn by the device as a whole may be greater during the start up process than after the power domains are operating.

In order to correctly start the device using a USB power supply the default USB current limit needs to be greater than the maximum current drawn during the start-up process (or at least the part of the start-up process to get to the stage where the device processor can negotiate and take control of the USB current limit), even allowing for minimum and maximum manufacturing tolerances of the PMIC and host circuitry and various possible load demand scenarios, and, of course, the USB host must actually provide the necessary power.

If a device manufacturer wants to use a relatively low default USB current limit it can be advantageous to reduce as far as possible the effect of current spikes in the start up process and to limit the current drawn by the various power domains of the device during start up. The PMIC may therefore be adapted to operate in a soft start mode of operation where current spikes are reduced or eliminated.

In a soft start mode of operation a current limit which is lower than the normal operating current limit of a power block may be applied to at least some power blocks during the start up phase. In other words in the soft start mode of operation at least some power blocks have a current limit applied which is lower than a current limit that will be applied once the device has started. The current limit applied to each power block is preferably arranged so that the current draw from all power blocks is less than the default USB current limit. For example if the default USB current limit is set to 100 mA then each power block may have a current limit of 100 mA or less. Or if there are four power blocks that have to be started simultaneously, each could be limited to 25 mA.

Applying a current limit to a power block comprising an LDO type voltage regulator is relatively straightforward. However applying a current limit to a DC-DC type of voltage regulator which is different from its normal operating current, especially a current limit which is significantly less than its normal operating current, is difficult. Therefore in a soft start mode of operation at least one power block arranged to operate in DC-DC type mode in normal operation of the device may be arranged to start up in an LDO type mode. Starting in an LDO type mode means that a current limit which is significantly lower than the usual operating current of the power block in device operation can be applied to the output of the power block during start up. Subsequently the power block can switch to a DC-DC mode of operation for normal device operation.

The PMIC may therefore be arranged with at least one power block operable in either one of a DC-DC mode or an LDO type mode. The power block may comprise an LDO circuit arrangement in parallel with a DC-DC circuit arrangement. Preferably the LDO is connected to drive the load capacitor of the DC, rather than drive the complex load of the inductor. The operation of the circuit may be regarded as the LDO pre-charging the load capacitor on start-up (with a current limited by the LDO), thus reducing any in-rush current when the DC-DC is eventually activated, since the DC-DC no longer has to provide a surge of current to charge up the load capacitor.

By limiting the current of the power blocks during start up the relatively large current draw during start up can be limited which can help to reduce or even remove a current spike from the device start-up current profile. Thus the USB current limit may be set at a limit based on the operating current of the device rather than a start-up current of the device. This may be enough to allow compliance to the 100 mA USB specification.

The PMIC may also be arranged in a soft start mode to stagger current supply to various power domains in the device to reduce the current drawn at any one time. For example two power domains may each draw a relatively high current during start-up due to the need to charge decoupling capacitors and the like but both may draw relatively low currents after the start-up phase. In a soft start mode the powering of one domain may be arranged to occur after powering of the other domain to avoid both drawing relatively high current at the same time.

Thus applying a soft-start mode while starting the power domains of the device may allow the device to start correctly, at least to a stage where the operating system of the device can take control of the power settings by sending appropriate command signals to the PMIC, but with a reduced maximum current draw during start-up compared to a conventional start procedure. This allows a default USB current limit to be chosen which may be lower than would otherwise be necessary in absence of a soft-start mode.

Starting the device in soft-start mode may increase the time taken to start the device (and in some cases the device may even fail to start-up in soft-start mode) and may not be necessary if the default USB current limit is chosen to be greater than the maximum current drawn during a conventional start procedure. Conveniently therefore the PMIC may be arranged, in use, to start in either a conventional start up mode or a soft start mode based on a setting programmed in NVM. In other words at the time the default USB current limit is set by programming the NVM the mode of starting the device may also be configured.

Whether or not the PMIC is arranged to enable the power blocks of the PMIC in a device start up procedure in a conventional or soft-start mode of operation, it may be the case that a USB power supply which has a relatively low current limit (whether imposed by the PMIC default USB current limit or by the host) provides insufficient current to allow correct start up of the device.

In one embodiment therefore, where the PMIC is also arranged to receive a power supply from an internal battery, the PMIC may be arranged to use the battery supply to supplement the USB supply to allow device start up. In other words any shortfall in current from the USB power supply for starting up the device is instead drawn from the battery power supply, if present and in suitably charged. The supply from the battery may supplement the USB power supply to a sufficient degree to cope with a current spike during start-up which exceeds the default USB current limit and/or is sufficient to start the device to a stage where it can negotiate for a greater supply from the USB host.

The PMIC may be arranged such that a supply from the battery to supplement the USB power supply may only be drawn if the battery voltage is above a certain threshold level. If the battery is below this threshold level it must be charged to this threshold level first. The threshold at which the battery is available to supplement the USB power supply during start-up may be a boot setting stored in a programmed NVM, i.e. the device manufacturer may be able to set the voltage level above which the battery can be used to supplement USB power supply during start-up.

Various different rechargeable batteries exist but commonly Lithium-ion or Lithium-ion polymer batteries are used in portable electronic devices. Such batteries have different safe charging regimes depending on the degree of depletion of the battery charge. For example a Li-ion battery which has been almost fully discharged should initially receive only a gentle charging current to avoid damage to the battery. Once a safe level of charge has been reached, determined by a specified voltage level of the battery, the charging can safely use a greater charging current in a constant current mode regime until a maximum voltage level has been reached. Charging at the gentle trickle charge limit is relatively slow.

The PMIC may therefore be arranged to operate in a pre-charge mode. In a pre-charge mode the PMIC is arranged to use the USB power supply to charge the battery to a level such that the battery can be used to supplement the USB power supply during a start-up procedure. In the pre-charge mode the battery may be charged with a trickle charge current below a fast charge threshold voltage. The fast charge threshold voltage may be configurable, as different batteries may have a different voltage threshold at which fast charging can be commenced. Were a non-configurable threshold to be set which was safe for all batteries, this would mean that some devices would be charged at the slow trickle charge rate for longer than was necessary, thus unnecessarily prolonging the time to charge the battery to the level where it can be used to supplement the USB power supply.

This embodiment of the present invention there fore provides a device manufacturer with the ability to choose a default USB current limit which is appropriate for their device and how they want the device to operate or with what USB host apparatus they wish the device to operate. A relatively high default USB current limit could be used to ensure that the device starts correctly when used with a USB power source that will supply such a high current without having first negotiated with the device, for example a USB hub or a dedicated power supply with a USB interface. However such a device may not operate correctly with USB hosts that only provide an initial current of 100 mA.

Alternatively a device manufacturer may choose to set the default USB current limit at 100 mA or some other relatively low value. To aid in device start up with such a relatively low current the PMIC may be arranged to start-up the device power domains in a soft-start mode to reduce the maximum start-up current required. Additionally or alternatively the PMIC may be arranged to use a battery power supply from an internal battery of the device to supplement the USB power supply in a device start up. In order for a depleted battery to be able to supplement the USB power supply during the start procedure the PMIC may be operable in a pre-charge mode where the battery is pre-charged to a voltage configurable in NVM. Once the battery has reached this voltage the device will automatically execute the start-up sequence.

This embodiment of the present invention there fore provides the device manufacture with options for reducing the impact of a relatively low USB current limit, such as 100 mA, on the ability for device start-up.

This aspect of the invention is not necessarily limited to a USB power supply however and it may be equally applicable to other types of bus power supply or device to device interface which provides or allows a power supply between devices.

In one embodiment of the invention there is provided a PMIC comprising: an input for receiving power derived from a bus type supply; circuitry coupled to said input for limiting the current drawn from said supply; and a non-volatile memory comprising at least one current limit setting wherein the default current limit drawn from said supply is based upon said at least one current limit setting.

In a sixth aspect of the present invention there is provided a method of configuring USB current limit of a power management integrated circuit to provide a default USB current limit comprising the step of obtaining at a USB current limit configuration setting from a non-volatile memory and using said USB current limit setting to configure USB current limiting circuitry.

The method of this aspect of the invention provides all the same advantages and can be operated in all the same embodiments as described above in relation to the fifth aspect of the invention. In particular the method may involve obtaining the USB current limit configuration setting from an NVM which is internal to the power management apparatus, i.e. which is part of and integrated into the power management apparatus.

The NVM is preferably the NVM that stores other default configuration settings for the power management apparatus but it may be a different NVM.

As mentioned above arranging the PMIC to supply power to the power domains of the device in a soft-start mode of operation during start-up of a device can help reduce current spikes during start up which may cause problems with current limits on power supplies. This can particularly be the case for a power block which operates in normal device operation in a DC-DC mode. Starting a DC-DC converter can also lead to a relatively large in-rush current.

Thus in another aspect of the invention there is provided a power management integrated circuit for providing, in use, a regulated power supply via an output terminal having at least a capacitive load connected between said output terminal and a reference voltage, said circuit comprising: at least a first regulator comprising a linear regulator and a non-linear regulator, said linear regulator coupled to said output terminal; a filter coupled between said output terminal and said non-linear regulator; and control circuitry for providing a control signal to said first regulator; wherein either said linear regulator or said non-linear regulator is enabled in accordance with said control signal so as to provide said regulated power supply.

This aspect of the present invention relates to a PMIC with a first regulator which has an output node coupled to a reference voltage, e.g. ground via a capacitive load. As the skilled person will appreciated when starting up in such a mode the capacitive node will require charging and this can lead to a relatively high in-rush current. Thus in-rush current can be difficult to control in non-linear regulators such as DC-DC converters and hence start up of such a converter can draw in-rush currents that exceed required limits, such as a USB current limit for example. The present invention therefore uses a first regulator which not only has a non-linear regulator coupled to the output node via a filter, for instance a DC-DC regulator wherein the filter is an inductor, but which also has a linear regulator directly coupled to the output node. The linear regulator, for may for instance be an LDO type regulator can be used on start up and the current in the linear regulator can be controlled more easily, thus reducing the in-rush current.

This embodiment of the present invention therefore operates the first regulator using the non-linear regulator when initially activated, i.e. when the first regulator is enabled. During the period when the regulator is operating in linear mode in-rush current can be prevented more easily. This start-up procedure can therefore help prevent a current spike and provides a smoother start-up profile.

The first regulator changes from using the linear regulator to using the non-linear regulator based on the control signal which can be generated in a variety of ways.

The non linear voltage regulator may operate in a DC-DC Buck (step down) mode of operation.

The PMIC may be configurable so that the first regulator may alternatively be operated using purely the non-linear regulator mode upon activation. A configuration setting could be stored in non-volatile memory indicating the mode of operation required on start-up. Additionally or alternatively the first regulator may be configurable so that the first regulator may alternatively be operated purely using the linear regulator upon activation. In other words the regulator may be configured so as to always operate in a non linear (e.g. DC-DC mode) or always operate in a linear (e.g. LDO mode) or operate initially using the linear regulator and then switch to using the non-linear regulator.

The power management apparatus may comprise a plurality of voltage regulators. The first voltage regulator may be the only one comprising linear and non-linear regulators as described or there may be a plurality of such regulators.

In an eighth aspect of the present invention there is provided a method of providing power to a power domain of a device comprising the steps of: supplying power from a first voltage regulator to an output node having a capacitive load connected between the output node and ground; the method comprising initially supplying power using a linear regulator coupled to the output terminal; and subsequently supplying power from a non-linear regulator coupled to the output node via a filter.

The method of the eighth aspect of the invention has all the advantages and can be used with all of the embodiments described above with reference to the seventh aspect of the invention.

It should be noted that a PMIC as described above with reference to any of the aspect of the invention may also comprise a PMIC as claimed in any other aspect of the invention. Some or all aspects of the invention may be implemented in a single PMIC.

Although the various aspects of the invention described above have been described with reference to integrated circuits the ideas and concepts of the invention are applicable to any power management units including composite power management units.

The various embodiments of PMICs and the methods described above may be used in a variety of electrical devices. The PMIC is particularly suitable for portable electrical devices. All aspects of the invention may be used in computing devices such as laptops, notebooks, PDAs and the like. All aspects of the invention may be used in media players such as MP3 or other media players or video players or portable television devices. All aspects of the invention may be used in communication devices such as mobile telephones or mobile email devices. All aspect of the invention may also be used for GPS devices or navigation devices or any other portable and/or battery operated electronic device.

BRIEF DESCRIPTION OF THE DRAWINGS

The invention will now be described by way of example only with reference to the following drawings, of which:

FIG. 3a illustrates the connections of one embodiment of data interface with no external NVM connected and FIG. 3b illustrates the connection with an external NVM connected;

FIG. 4 illustrates a PMIC according to another embodiment of the present invention;

FIG. 5 is a flow chart illustrating the process followed by one embodiment of PMIC;

DETAILED DESCRIPTION

Figure 1:
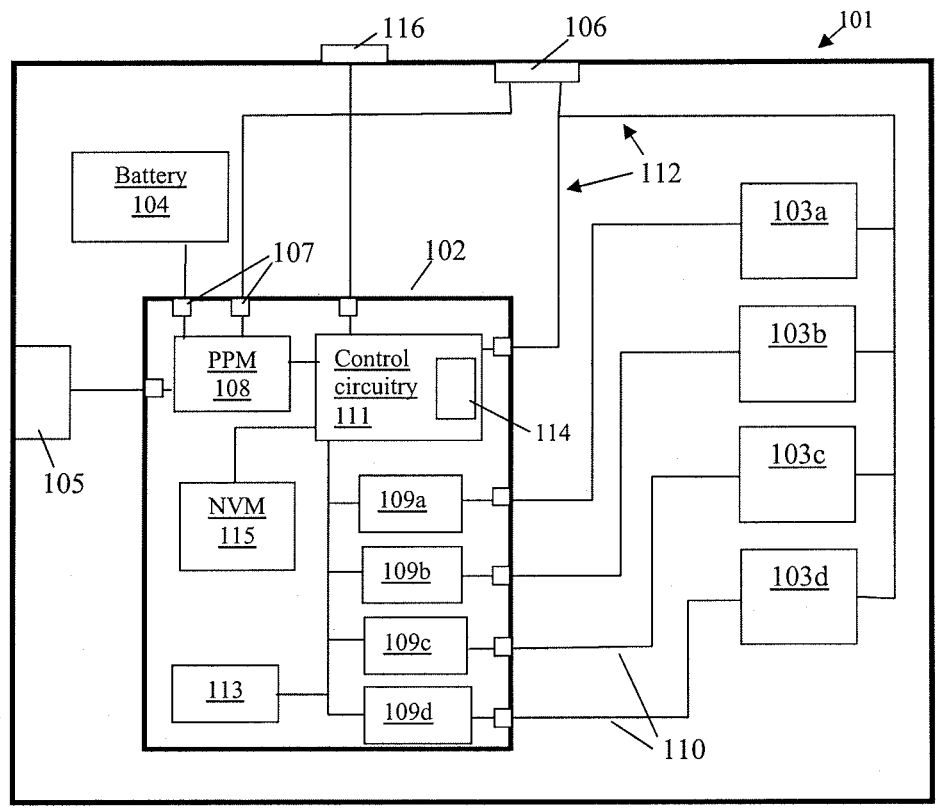
FIG. 1 illustrates a typical power management unit of a portable device.

FIG. 1 illustrates the general principles of the power supply and power management in a device, generally indicated 101, which may, for instance, be a portable device. The device 101 includes a power management integrated circuit (PMIC) 102 for managing power supply to the device. The PMIC receives power from various possible power sources and regulates the power supply to the various power domains 103a-d of the device. In this example the device has three possible power sources. There is an internal battery 104 for supplying power when other power sources are not available. The device also has a bulk power interface 105 adapted to receive bulk power, i.e. an interface that is designed to operate with equipment allowing the device 101 to be powered from a socket delivering mains electricity, e.g. a wall socket in the home. For portable devices the bulk interface is typically designed to interface with an external adapter that plugs into the mains supply and converts the AC supply to a suitable DC supply. Having an external adaptor reduces the size and weight of the device itself.

However the bulk interface could receive an AC mains supply and the device could include a mains adapter if necessary. The device also has a device-to-device interface 106, such as an USB interface, that is designed to interface with a connector for linking devices together in a manner that allows a power supply. USB connectors are well known for connecting devices together to allow for data transfer and also power supply from a host to a device but other types of interface could also be used. Other devices may of course have different arrangements of possible power sources and some devices may have an additional backup charge store, such as a battery or large capacitor to provide power for a certain period of time if the main internal battery is removed or completely discharged.

The internal battery, the bulk interface and the device-to-device interface are connected, via suitable pins 107 on the PMIC, to power path management circuitry 108 of the PMIC. The power path management circuitry switches between power sources depending on the available power supplies. The power path management circuitry may also provide power to a battery charger (which may or may not be integrated within the PMIC) for charging the internal battery.

In operation the power path management circuitry 108 of the PMIC 102 selects the appropriate power source from those available. The PMIC also acts to regulate the power supply to provide the necessary power for the device power domains. As mentioned above the device has various power domains 103a-d. Each of these power domains 103a-d represents a sub-system of the device which receives its own power supply from the PMIC. Four power domains are shown in FIG. 1 for ease but the skilled person will appreciate that some devices may have many more power domains. As a simple, non-limiting example power domain 103a may be a processor core. Power domain 103c may be a volatile memory and power domain 103b may be an I/O sub-system for data transfer between the processor and the memory. Power domain 103d may be a Real Time Clock for maintaining a count used for the date and time. Each of the power domains may have different power requirements in operation.

The PMIC therefore comprises a plurality of power blocks 109a-d and the power outputs of the power blocks 109a-d are connected, via appropriate power lines 110, to the appropriate power domains 103a-d. The power blocks comprise regulators for regulating the power supplied by the power block. Such regulators may typically be DC-DC Buck (step-down) converters, DC-DC Boost (step-up) convertors, Low Drop Out (LDO) regulators or Charge-Pump type regulators. Some power blocks have regulators operable in more than one mode, e.g. a regulator may be arranged to be operable as either an LDO or a DC-DC regulator. The power blocks may typically be configurable to provide a range of possible outputs. Typically a PMIC will have a plurality of power blocks comprising regulators of different type and/or output range to cater for the different power requirements of the device sub-systems. For example the CPU core 103a may require a relatively large maximum current and hence a DC-DC Buck convertor may be suitable for power block 109a, for example with an output range of about 0.5V to about 2.0V with a maximum current of about 1 A. Were the device to have a display with a backlight, the backlight may require a larger voltage and so a DC-DC Boost converter may be used to give a voltage output in the range of 5V-20V say. Other device sub-systems may need low maximum currents and an LDO may be used. The Real Time Clock 103d of the device may need a very low current and hence power to such a device may be regulated in power block 109d using an LDO with a maximum current of around 10 or 20 mA or so.

The output of the regulators is determined by the output configuration settings stored in circuitry associated with the regulator. Together the regulators and associated circuitry form the power block. The regulators and storage circuitry may be physically contiguous, or the storage may be elsewhere in a central location on the chip.

The power blocks are controlled by the control circuitry of the PMIC 111. The control circuitry 111 determines which power blocks are active in the PMIC and also the output of the active power blocks. Some power domains, when active, may require a fixed power supply but for others the power requirements may vary with usage of the device. The control circuitry may therefore be arranged to receive, via command and control signal lines 112, information regarding the power requirements of the power domains 103a-d and to control the outputs of power blocks 109a-d accordingly. The control signal lines 112 could comprise a serial communication bus or a number or hardware signal lines. The control signal lines may also be used to communicate control information back to the power domains. As illustrated some control signal information may also be received via the device-to-device interface 106.

The power control circuitry 111 comprises a memory such as one or more registers 114 for maintaining settings for operation of the PMIC, i.e. settings for controlling the power blocks, the power path management circuitry and any other configurable features of the PMIC. These settings may be updated by the processor for example writing new settings to the PMIC control circuitry registers via the command and control lines 112.

The power path management circuitry and control circuitry clearly will also require power and so the PMIC will typically also have at least one power block 113 for providing internal power to the PMIC.

Typically a PMIC is arranged to provide a plurality of different power states wherein different rules govern the power supplied to the power domains in the different power states. For example the PMIC may have an ON power state where all power domains 103a-d are active and powered according to usage, i.e. the rules implemented by the control circuitry are defined such that each power domain is supplied with the power it needs. This may mean that power is always supplied to a particular domain in the ON state or may mean that power is only supplied when the particular device sub-system is required.

The PMIC may also provide an OFF state where the majority of the power domains are unpowered. In some devices however there may be a need to maintain some power even when the device is off. For instance devices that maintain an internal date and/or time are provided with a Real Time Clock and, to avoid the requirement to re-enter the time every time the device is switched on, power is maintained to the Real Time clock even when all other device sub-systems are off. The power domain or domains that are always on, whatever the power state, provided there is at least some power available, are often referred to as Alive power domains. In the simple example described above power domain 103d, comprising a Real Time Clock, is therefore an Alive power domain. Note as shown in FIG. 1 the Alive power domain 103d containing the Real Time Clock is external to the PMIC. In some embodiments the PMIC itself may be provided with a Real Time Clock. The PMIC itself however typically remains powered in the OFF power state, i.e. power block 113 maintains power to the PMIC in the OFF state.

The PMIC may also have a SLEEP state, and this state may be used where the device has different functionality. In the SLEEP state some device power domains may be inactive with no, or minimal, power being supplied whilst other, non Alive, domains are still active.

In each of the ON, SLEEP and OFF power states the PMIC itself may typically be fully operational, i.e. the PMIC control circuitry and power path management circuitry is powered by power block 113 although in some applications the PMIC may be arranged so that power block 113 can be switched off in the OFF state and thus the control circuitry and power path management circuitry are largely unpowered. In any case, in some instances the power supply to the PMIC may cease due to a lack of suitable power supply. For instance if no external power supply is connected and the internal battery 104 is completely exhausted or removed the PMIC will enter a NO-POWER state. It will be appreciated that when the power is removed from the control circuitry the settings in the registers 114 will be lost. The PMIC control circuitry is therefore arranged with a non-volatile memory (NVM) 115 which stores the boot settings for the power blocks of the PMIC, i.e. which power blocks are to be active in a given power state and the default power domain settings. As soon as the control circuitry is powered, for instance when a charged battery is inserted or an external power supply is connected, it may access the NVM to determine the settings for the power blocks of the PMIC. Note that FIG. 1 shows the NVM 115 as part of the PMIC and typically PMICs do include an NVM for storing the default boot configuration settings needed for start up (sometimes referred to as bootstrapping). However some devices may be arranged with a PMIC adapted to access an NVM which is external to the PMIC.

It will be noted that some PMICs may provide additional power states. For instance there may be different types of ON state offering different levels of functionality or SLEEP states, or Stand-by or Hibernate states. The skilled person will appreciate that the device may have other power states that are not generally noticeable to the user but which relate to various device states. For instance there may be a BACK-UP power state which is reached if the main internal battery is removed or completely discharged. In the BACK-UP state an additional charge store, such as a secondary battery may be arranged to keep an Alive power domain powered but power block 113 may not power the PMIC. Thus the PMIC register settings may be lost in the BACK-UP power state as well. For ease however the explanation will focus on the most common power states and the common power state transitions.

In operation, when the device is off but power is available (i.e. the PMIC is in an OFF power state), a command to turn the device itself on, i.e. for the PMIC to transition to an active state, e.g. an ON or SLEEP state, may be received in a variety of ways. The device may have a central power control switch 116 which can be operated by the user to turn on the device, the closure of the switch being detected by the PMIC and used as an indication that the PMIC should transition to the ON state.

A command for the PMIC to transition from the OFF state to the ON state could also be generated by a Wake Up Timer in the Alive power domain which is responsive to the Real Time Clock.

A command for the PMIC to transition from the OFF state to an active state may also be received by the device-to-device interface 106. For instance, connecting the device to an active host device may result in a start command being generated. Alternatively activating a host device to which there is an existing connection may also result in a start command.

However the power state transition command is generated it is communicated to the PMIC to act upon. In the PMIC OFF power state the device processor is unpowered and hence can't communicate any power state requirements. The PMIC therefore uses default boot settings as part of a start-up routine, often called a bootstrapping or boot process.

The default boot settings for the power blocks 109a-d are stored in the NVM 115 so that the settings are available to the PMIC after a period when the PMIC itself is unpowered. When power is supplied to the PMIC, e.g. the PMIC transitions from the NO-POWER (or BACK-UP) power state to the OFF state say and power block 113 starts supplying internal power to the PMIC, the control circuitry loads the relevant default configuration settings into the registers 114.

The data stored in the NVM comprises boot settings for configuring the PMIC and some of these boot settings will be applied straight-away. For instance any default current or voltage limits for the power path management circuitry may be imposed. Further the PMIC may have a number of configurable attributes such as the function of general purpose pins and the like which need to be configured in the PMIC OFF state. For example control switch 116 may be connected to a general purpose pin, the function of which needs to be configured based on the boot settings for the PMIC. Thus some of the boot settings loaded from the NVM 115 into the registers 114 are used to control the PMIC in the OFF state and used in a boot process of the PMIC itself.

As mentioned above however some of the settings relate to the configuration settings of the power blocks, and sequence of activation etc, that may only be used in a subsequent transition from the PMIC OFF to an ON (or SLEEP) state. These settings are loaded when the PMIC is powered but will only be used in a subsequent device boot sequence.

Boot settings will be required by the PMIC whenever the PMIC itself goes from an unpowered to a powered state. For instance from a NO-POWER (or BACK-UP) state to an OFF state say (although it will of course be appreciated that in some embodiments a PMIC could be arranged to be unpowered in an OFF state). Boot settings may also be required in response to a reset command. Various monitoring systems such as watchdog timers may monitor the operation of the device and, in the event of device failure, may initiate a reset to force all settings back to their default boot values. The device may also have a reset button or switch that the user can operate to force such a reset.

Unless there is a reset command boot settings may be maintained in the PMIC registers for as long as the PMIC remains powered. This means that the device may be turned off and on multiple times, i.e. the PMIC transitions from the OFF state to the ON state and subsequently back to the OFF state several times, without requiring boot settings to be reloaded from the NVM. It will also be noted that in the PMIC ON state the device processor is active and it may instruct the PMIC control circuitry to alter the boot settings stored in the registers. These altered boot settings may be retained in the PMIC registers and used in subsequent device boot sequences. Only if the PMIC loses power (or there is a reset command) will the original boot settings from the NVM need to be loaded again for when the PMIC is powered.

It is possible however to arrange to PMIC to require boot settings from the NVM each time the PMIC transitions from a PMIC OFF state to an active state. This may be used such that any modified boot settings, which may not operate correctly, are not used.

The NVM 115 may be any form of memory arrangement and may be one-time-programmable (OTP) NVM, i.e. NVM that can be programmed once and can't readily be re-programmed. For any given device the boot settings for the PMIC don't generally need to be updated in normal operation of the device. Thus internal OTP NVM represents an acceptable, low cost memory for storing the boot settings for the PMIC.

However if the device becomes corrupted in any way, for example some device sub-system becomes corrupted and interferes with normal device start up it may not be possible to correctly start the device using the boot settings stored in the NVM. However diagnosis and repair of the device may depend on at least parts of the device being operational.

Also, during development, for instance development of a particular device, the developer may wish to try a variety of different boot settings for the PMIC to ensure optimal start up performance of the device.

Figure 2:
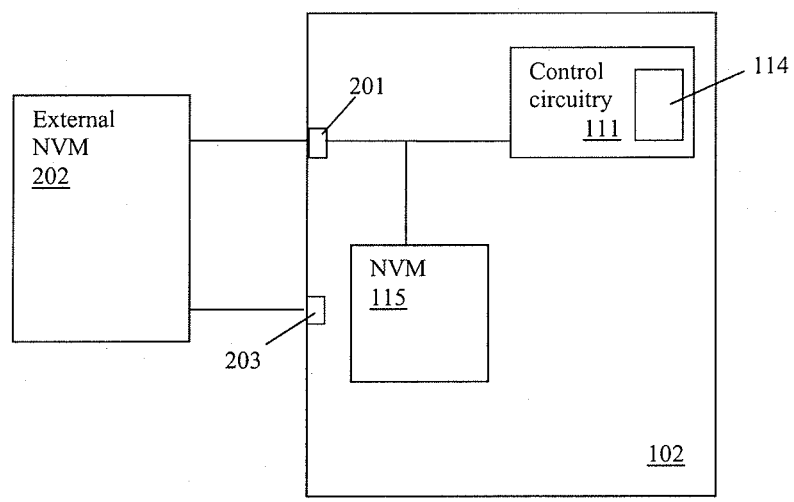
FIG. 2 illustrates a PMIC according to an embodiment of the present invention.

FIG. 2 illustrates an embodiment of the present invention that allows a greater flexibility in provision of boot settings. In this embodiment the PMIC 102 has an internal NVM 115 as described previously, which may be an OTP NVM or may be a reprogrammable NVM such as an EEPROM or the like. The PMIC 102 also has a data interface 201 for connecting to a source 202 of boot settings which is external to the PMIC 102. The external source 202 is conveniently an NVM itself and may conveniently be a reprogrammable NVM. However, depending on the situation the external source 202 could be a volatile memory powered by an external source or even some sort of processor device for providing boot settings for the PMIC when required. In this embodiment the PMIC also has an external NVM power supply port 203 which is used to supply power to the external NVM 202. This power supply is linked to the PMIC power supplied by power block 113 shown in FIG. 1 and hence the external NVM, if connected, may be powered whenever the PMIC is powered. Conveniently power is supplied to an external NVM supply only when necessary to check whether an external NVM is connected and, if an external NVM is connected, when the data in the NVM needs to be read. An external NVM, if present, can be powered down after it has been read until it needs to be read again.

When boot settings are required by the PMIC the control circuitry is arranged to obtain boot settings from the external NVM 202 if present otherwise to obtain settings from the internal NVM 115.

Whilst it would be possible to arrange the control circuitry to ignore the internal NVM when the external NVM is present, in this embodiment the control circuitry is arranged to initially load settings from the internal NVM into the registers 114. If an external NVM is detected the settings from the external NVM are then loaded into the registers and used to overwrite at least some of the corresponding settings obtained from the internal NVM. Only after the settings from the external NVM (if present) have been obtained are the settings used to configure the PMIC. In this way the settings obtained from the external NVM are the ones used for configuring the PMIC.

Thus, in the absence of an external NVM 202, the control circuitry will obtain boot settings from the internal NVM as described previously. However, if an external NVM is present the control circuitry instead uses the boot settings stored in the external NVM. The control circuitry is therefore arranged to automatically use boot settings stored in the external NVM in preference to any stored in the internal NVM 115.

Thus, by connecting an external NVM 202 to the data interface 201, any boot settings programmed into the internal NVM can be automatically replaced by those in the external NVM. This can be useful for diagnosis and repair or debugging of a device. Imagine the PMIC is used in a device with suitably programmed OTP NVM and, during the life of the device an aspect of the device becomes corrupted such that the boot sequence fails to operate. This could be due to corruption of the NVM leading to the wrong boot settings being used. This can easily be checked by connecting an external NVM, programmed with the original boot settings for the internal NVM and attempting to boot the device. If the device boots correctly this may suggest corruption of the NVM. If possible, and cost effective to do so, the device could then be simply repaired by leaving the external NVM connected. If however the device still fails to boot correctly the settings in the external NVM could be changed so as to only start some power blocks and thus start some power domains of the device in the device boot sequence. The ability to change the boot settings in the external NVM allows a systematic diagnosis of the device to be performed.

This embodiment of the present invention also means it is possible to start the device without any boot settings being programmed into the internal NVM. As long as a suitably programmed external NVM 202 is present it doesn't matter what, if anything, is programmed into the internal NVM. This is particularly useful for a device developer who may want to try various different boot settings before committing anything to the internal NVM.

As this embodiment of the present invention allows the PMIC to perform a start-up sequence with an unprogrammed internal NVM the PMIC is preferably arranged to perform a safety check, in the event that no external NVM is connected, to determine that the internal NVM is not blank. This prevents the PMIC control circuitry from interpreting the contents of the unprogrammed internal NVM as genuine default configuration settings and configuring, for example, the power blocks accordingly which could result in damage to the device. The control circuitry may therefore check the status of a setting in the internal NVM that indicates whether or not it has been programmed and, in the event that the internal NVM has not been programmed, terminate the boot procedure. This check may be performed by reading the contents of the internal NVM into registers, as described above, and then checking the status of the appropriate register. If the setting indicates that the NVM is unprogrammed the contents of the registers are not used to configure the PMIC, and/or no boot sequence will be executed even when a condition to start-up the device exists.

The settings obtained from the external NVM may be used to totally overwrite any settings loaded from the internal NVM so as to allow all settings of the PMIC to be controlled by the external NVM. However the internal NVM may be arranged to contain some data which may not be present in the external NVM. For example the internal NVM may be arranged to contain various identification codes and the like specific to the PMIC or various other factory settings. These factory settings may be loaded into registers in the PMIC in a register location that is not overwritten with data obtained from the external NVM. The settings regarding configuration of the power blocks, power path management, pin function control and the like may be loaded into a different part of the registers which can be overwritten by data from the external NVM.

The external NVM may also comprise some data which is not stored in the internal NVM, for instance data necessary for data verification and checking to ensure that the data from the external NVM has been loaded correctly. This data may be loaded into a location in registers of the PMIC which does not contain any data loaded from the internal NVM.

In one embodiment one or more settings loaded from the internal NVM may be protected so that, when read into the registers of the PMIC, such settings are not overwritten with corresponding settings from the external NVM. For example each setting or group of settings, e.g. the settings configuring an individual power block for example, may be provided with a protected status flag (i.e. a setting stored in the internal NVM and loaded into the PMIC registers). If this flag indicates that the relevant setting is protected the data loaded from the internal NVM will not be overwritten with data from the external NVM. However if the setting is not marked as protected the data will be overwritten by the corresponding setting in the external NVM. In this way the settings stored in the external NVM are used in preference to those stored in the internal NVM apart for any protected settings, in which case that stored in the internal NVM is used. The protected flag may be set for power blocks supplying power to certain critical power domains in the device to prevent after sale device modification which may potentially be hazardous.

Conveniently the control circuitry communicates with the external NVM, when connected, in the same way as it would communicate with the internal NVM. Various communication protocols are known and the control circuitry may communicate with the external NVM or internal NVM using the I²C™ communications protocol say. The circuitry required to read boot data from an NVM is well known in the art and could easily be implemented by the skilled person.

The data interface may simply comprise contact pads or pins for connecting the appropriate signal lines of the PMIC to the external NVM. For the I²C™ protocol there are two signal lines, a Serial Data signal line and a Serial Clock signal line although other protocols are known and may use one signal line or more than two signal lines. The use of a communications protocol such as I²C™ also offers a convenient way to detect connection of the external NVM. The skilled person will appreciate that I²C™, in common with other communication protocols, is a data low protocol and uses pull up resistors to keep the signal lines logic high when there is no data to be transmitted. The presence of these pull-up resistors, i.e. the logic high on the signal lines, can be used to automatically detect when the external NVM is connected. The pull-up resistors are therefore arranged either external to the PMIC or arranged as part of the data interface but only connected to the PMIC signal lines when a suitable connector has been connected to the interface. For instance the data interface could comprise a socket arrangement arranged to interface with a specified connector and arranged such that when the connector is correctly in the socket the pull-up resistors are connected but when the socket is empty they are not.

FIGS. 3a and 3b illustrate the data interface for an I²C™ communication system and how the pull-up resistors may be used to automatically identify when an external NVM is connected. A contact pad or pin 301 is connected to a Serial Data signal line of the PMIC and a contact pin or pad 302 is connected to a Serial Clock signal line on the PMIC. In the situation where no NVM is connected both signal lines may be arranged to be connected to ground. Thus, with no external NVM connected the signal lines will be logic low. FIG. 3b shows the arrangement when the external NVM is connected. Contact pad or pin 301 is connected to a Serial Data connection line which connects to a Serial Data port of the external NVM. Similarly contact pad or pin 301 is connected to a Serial Clock connection line which connects to a Serial Clock port of the external NVM Both of these signal lines have pull-up resistors 303 connected to the signal line and a voltage supply 304 to pull the signal line to a logic high state.

When the PMIC is powered and the control circuitry requires boot settings, the value of either or both the Serial Data signal line and Serial Clock signal lines connected to the data interface 201 can be used to automatically detect a data connection—which is taken to be a connection to a suitable NVM. If these signal lines are logic high when boot settings are required the control circuitry obtains the default configuration settings from the external NVM. However although means of detecting the presence of an external NVM may be used, such as some sort of bus protocol or other handshaking type exercise as would be understood by one skilled in the art.

In another embodiment of the present invention the connection of an external NVM may be used to provide for programming of the internal NVM of an integrated circuit. This embodiment will be described in relation to a PMIC but may be generally applicable to any integrated circuit having an integrated, internal programmable NVM.

As the skilled person will appreciate the standard method of programming an internal programmable NVM of a PMIC is to connect a specialist programming tool to the PMIC via the main communication interface of the PMIC. The programming tool issues various commands to the PMIC to enter a programming mode and pushes the boot settings to be programmed into the NVM into the registers of the PMIC. The tool configures the registers of the PMIC to form a mirror of the required configuration in the internal NVM and then instructs the PMIC to write the settings into the NVM. Once the settings have been written the programming tool instructs the PMIC to read back the settings and performs various data integrity checks on the data. If the data integrity checks verify that the data is correct the data can be finalised. This process may be repeated for various pages of data.

The use of such a programming tool is a relatively complex and specialist task which adds complexity to the device fabrication process. Further the tool itself can be relatively expensive.

FIG. 4 illustrates an embodiment of the invention which simplifies the programming of the internal NVM. The PMIC shown in FIG. 4 has a data interface 201 for connecting to an external source of boot settings, in this case an external NVM 202. This data interface may be exactly the same as described above with reference to FIGS. 2 and 3a and 3b and the PMIC may function in exactly the same way as described previously. In this embodiment the PMIC also has programming circuitry 401 arranged to program the internal NVM 115 using the data stored in the external NVM 202.

The programming circuitry 401 may be part of the control circuitry 111 of the PMIC or may be a separate circuit module. The programming circuit 401 is arranged, in response to a valid program instruction, to automatically self-program the NVM, i.e. to carry out all the programming steps without interaction by a user. The settings can be loaded to a register map into the PMIC as described above with reference to FIG. 2. This does not require the main control and command interface of the PMIC and hence does not require various parts of the device to be active. The settings are loaded directly from the external NVM to the registers where they can be programmed into the internal NVM. The programming circuitry is arranged to perform data verification and integrity checks on the written data as described previously and will only finalise the write if the verification is positive. If an error occurs the programming circuitry can indicate an error, for instance by setting an appropriate status flag in one or more of the internal NVM, the PMIC registers or the external NVM.

Before programming begins, in response to a program instruction, the programming circuitry will first check whether the internal NVM is capable of being programmed, i.e. it isn't an OTP NVM which has previously been programmed or at least that the relevant section of the NVM hasn't previously been programmed. The skilled person will appreciate that an OTP NVM may be programmed in distinct sections and so the check is whether the section or sections which are intended for programming are available for programming. The programming circuitry may also check that a suitable power source is available. As the skilled person will appreciate programming the internal NVM typically requires a relatively high voltage source. This high voltage source may be supplied via a specified pin (not shown) on the PMIC or could potentially be provided via the power path management circuitry or a suitably configured power block.

The programming instruction could be generated in a number of ways, for instance if the external NVM 202 was part of a device with some intelligence it could transmit a programming instruction via the data interface. Alternatively a programming instruction could be transmitted to the control circuitry via the communications interface of the PMIC and then passed on to the programming circuitry. In one embodiment however the PMIC automatically detects a programming instruction by checking the status of a setting in the external NVM.

When the PMIC is powered from an unpowered state (or a reset signal is received) the control circuitry may be arranged to load the contents of the internal NVM into registers as described above with relation to FIG. 2. If an external NVM is detected the control circuitry may then load the contents of the external NVM into the registers and overwrite the data in the registers also as described above. The control circuitry or programming circuitry may then check the status of a programming setting indicating whether or not the settings in the external NVM are to be used for programming the internal NVM. This may for instance be a single bit with logic high indicating that programming is required and logic low indicating that programming is not required. If the bit setting indicates that programming is not required the control circuitry may use the settings to configure the PMIC as described previously.

However if the bit setting indicates that programming is required the PMIC enters programming mode, provided that the NVM is suitable for programming and suitable power is available. The check that the NVM is suitable for programming may be performed by examining the status of a bit setting in the data loaded from the internal NVM (recall that a similar check is performed before attempting to use any settings loaded from the internal NVM although the check as to whether the NVM is blank and the check whether the NVM is suitable for programming may look at different settings within the NVM). This check may be performed after the data has been loaded from the internal NVM and before data is loaded from the external NVM (the result stored in a separate register) or, if the programming status setting of the internal NVM is arranged so as not to be overwritten by any data obtained from the external NVM this check can be carried out after the data is loaded from the external NVM.

Once in programming mode the programming circuitry proceeds to program the data stored in the registers into the NVM. In programming mode the PMIC may transition to a PROGRAM power state.

The skilled person will be aware of various ways in which the programming circuitry could be implemented. The programming circuitry is in effect a state machine which could be embodied in a number of different implementations. The state machine acts to perform a number of programming steps to apply the voltage pulses of sufficient amplitude, width and duration to suitably program the internal NVM with the data stored in the registers and to perform the necessary data integrity checks. The exact nature of the voltage pulses will depend on the particular programmable NVM used. FIG. 5 is a flow chart illustrating the various decisions that are automatically made by the PMIC according to this aspect of the invention.

On activation of the PMIC 501 from an unpowered state, or on receipt of an appropriate reset command, the PMIC determines in step 502 whether an external source of configuration settings, for instance an external NVM, is connected. If an external source of configuration settings is not present flow proceeds to step 503 where the settings from the internal NVM are loaded. It will be appreciated however that in an embodiment described above the data from the internal NVM is loaded in any case. Once the settings from the internal NVM have been loaded in the absence of any external NVM the PMIC checks, in step 504 whether or not the internal NVM is blank, for instance by checking the status of a bit indicating whether or not the internal NVM has been programmed. If the internal NVM is blank or unprogrammed the control circuitry inhibits 505 device power up and the process ends 506 with the PMIC remaining in OFF state. The control circuitry may also be arranged to set some type of status flag indicating that no valid boot settings were available. When this status flag is set the PMIC will inhibit a device start-up (thus requiring valid boot settings to be loaded to clear the no boot settings flag). If the internal NVM is not blank the settings loaded from the internal NVM are used in step 507 as the default configuration settings and the process ends 506. Depending on the reason why boot settings were required the PMIC may then use these boot settings straightaway in a device boot sequence or the PMIC may remain in OFF mode ready to boot to perform a boot sequence when necessary.

If in step 502 the PMIC detects that an external NVM is present it instead loads 508 the configuration settings stored in the external NVM and effectively ignores the internal NVM. In the alternative embodiment however it simply overwrites any data previously obtained from the internal NVM (which is not protected) with corresponding settings from the external NVM. The process then flows to step 509 where the PMIC checks to see whether a program bit is set in the setting obtained from the external NVM. If the programming bit is not set then the PMIC uses 510 the external NVM data as the default configuration settings for device start-up. The process then ends 506. However if step 509 finds that the programming bit is set the PMIC uses the external NVM data to program 511 the internal NVM and the process then ends 506. In an alternative embodiment the freshly programmed data may then be used as default configuration settings for device start-up.

It will be appreciated that the outcome of steps 507 or 510 result in the PMIC being configured utilizing the appropriate default configuration settings. The device may be turned on in such a state resulting in the PMIC using the appropriate settings to transition to a PMIC ON state. In an alternative embodiment the outcome of step 511 can be used as well as default configuration settings, and the device may be turned on in such a state resulting in the PMIC using the appropriate settings to transition to a PMIC ON state.

As described it is conventional to store the default boot settings for configurable aspects of the PMIC and the power blocks in NVM and use such stored settings in a boot procedure to determine which power blocks are to be active in the target power state, the order in which they should be activated and what the default power domain settings for each active power block are.

Figure 6A:
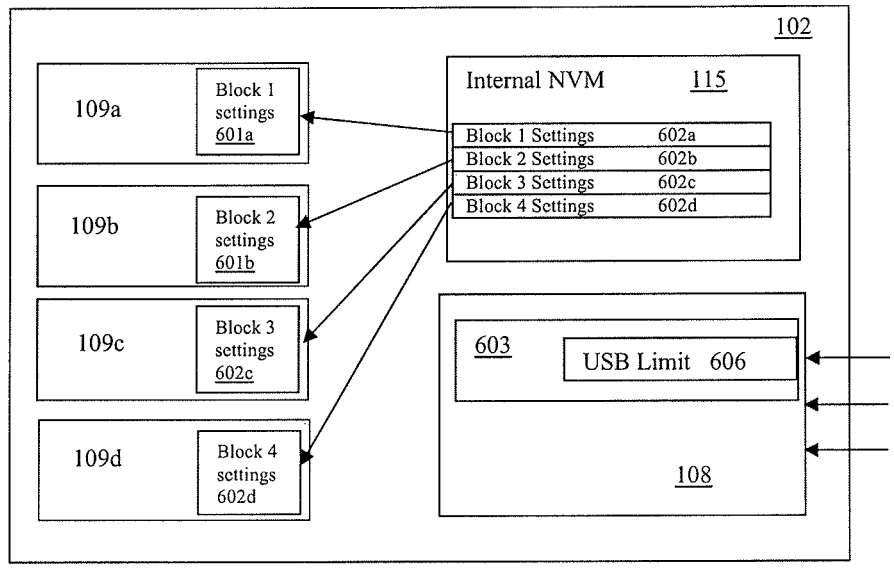
FIG. 6a illustrates a conventional PMIC arrangement for storing default configuration settings.

FIG. 6a conceptually illustrates this process. In use, the operation of each of the power blocks 109a-d of the PMIC 102 is determined by the relevant configuration settings 601a-d. By controlling the configuration settings 601a of power block 109a the operation and output of power block 109a is controlled. The skilled person will of course appreciate that the portrayed layout is for the purposes of explanation only and should not be taken to imply an actual physical layout of the power blocks or location of the configuration settings.

The internal NV M 115 stores the boot settings 602a-d for each of the power blocks. When the PMIC goes from an unpowered state to a powered state the boot settings 602a-d are loaded and provided to the relevant power blocks for use when the device is activated. Note that the settings are loaded when the PMIC is powered but may only be used in a subsequent power state transition.

In a conventional PMIC however a default USB current limit setting 606 is arranged as hard-wired register setting, e.g. the register setting will be set appropriately by power-on reset circuitry. As mentioned previously the PMIC may have power path management (PPM) circuitry 108 responsible for all aspects of power path management, from detecting and monitoring the available supplies and determining which supply to use, to impose any necessary current or voltage limits and, where necessary, for charging the internal battery. The PPM circuitry may therefore comprise USB current limit circuitry 603 for imposing a USB current limit based on the USB current limit setting 606.

The USB current limit circuitry imposes a limit drawn by the device from a USB supply. The USB 2.0 specification describes how power may be distributed from a host to another device via a USB connection. The USB specification defines a supply of 100 mA as a Unit and specifies that a device should not draw more than one Unit unless that device negotiates with the host and is classified as a High Power device—at which point it can be allocated up to five Units if such additional current is available.

What this means is that unless a device has identified itself to a host and negotiated for a greater current supply it should limit itself to a current draw of 100 mA. Attempts to draw more than 100 mA from a host before negotiating for a greater limit may simply be unsuccessful or may result in the host ceasing any power supply to that device. However once a device has successfully negotiated for a higher current supply from the host it may draw up to 500 mA (depending on the capability of the host and other power demands on the host).

The USB current limiting circuitry 603 therefore imposes a limit on current drawn through the USB supply. The current limiting circuitry is conventionally arranged to be configured to limit the current to at most 100 mA or 500 mA. In operation the device operating system, e.g. the device processor, can communicate with the control circuitry of the PMIC to set the USB current limit to the desired limit by controlling the appropriate configuration settings 606. The settings are stored in registers and the PPM circuitry is arranged such that the default current limit is 100 mA by hardwiring the power-on reset to the appropriate register to have the appropriate default value. As a simple example the circuitry may limit the USB current to either 100 mA or 500 mA based on a single register bit setting. By ensuring that the logic low setting imposes the 100 mA limit the default configuration, when the registers go from being unpowered to being powered, will be a logic low for the USB current limit. Hence the default USB current limit is effectively hard-wired into the PPM circuitry.

Increasingly however the increasing functionality of many portable electronic devices mean that in some instances the start up current required may be greater than 100 mA. If such a device is powered by a USB supply on start-up it will be limited to a maximum current of 100 mA and may not start correctly. As explained above the device can negotiate for a greater current supply from the host device but, to do so, the device processor and all necessary communication systems must be operational. If the device requires more than 100 mA to get to the stage where it can ask for a greater supply it can never actually engage in negotiation with the host device and the boot process will fail.

Figure 7A:
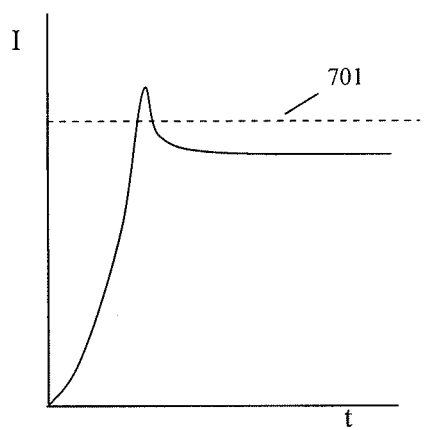
FIG. 7a shows a graph of current draw against time for device start-up and FIG. 7b shows the current draw against time for device start up according to an embodiment of the invention.

It should be noted that some devices may be rated as drawing less than 100 mA when operational but they may still nevertheless draw more than 100 mA during start-up. The skilled person will appreciate that start-up processes may lead to a current spike as illustrated in FIG. 7a which shows current drawn against time for a boot procedure. Line 701 may represent a current of 100 mA. If a device has such a start-up current profile it may be prevented from starting correctly with a USB power source by imposition of the USB current limit. Such current spikes can be caused by the need to charge decoupling capacitors and the like when starting to supply power to a power domain.

Figure 6B:
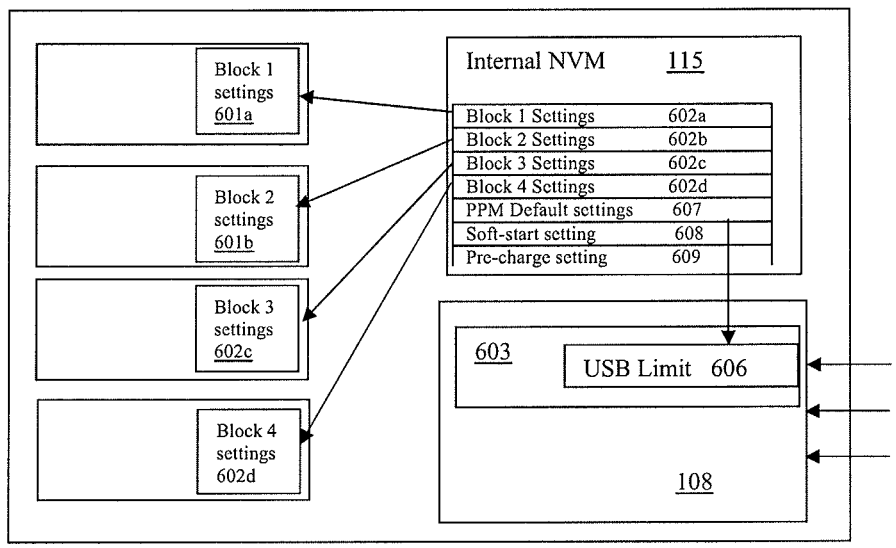
FIG. 6b illustrates an arrangement for storing default configuration settings according to an embodiment of the invention.

FIG. 6b shows an embodiment of the invention wherein the NVM 115 also stores a USB current limit boot setting 607 for USB current limiting circuitry. In this embodiment the default USB limit is not hard-wired into the PPM circuitry but instead is determined by the value stored in the NVM 115.

For devices where the 100 mA limit is appropriate as a default limit the default setting stored in NVM 115 can indicate the 100 mA limit. For other devices however a 500 mA limit may be chosen to be the default current limit. The default or boot USB current limit may be configurable to any of a range of possible current limits that the current limiting circuitry is capable of enforcing. The current limit may be set to be more than 1 A.

Some recent USB host devices, in particular dedicated USB hubs, have been produced which will supply a device with up to or more than 500 mA even before negotiation. A device which requires more than 100 mA to start-up could therefore be powered satisfactorily, even for start-up, using such USB hubs. The device manufacturer can configure the PMIC for the particular device and may choose a USB current limit which matches the device's accessories. If a device manufacturer produces a power adapter for a device with a USB interface that supplies 900 mA for example the USB default current limit may be set at or above 900 mA.

Further, even USB hosts which are arranged to impose a 100 mA current limit may allow a device a certain amount of leeway. That is they may allow a device to draw slightly more than 100 mA for a short period of time. If the start-up process of the device thus draws a peak current of 120 mA say and is only above the 100 mA limit for a short period of time the host might actually allow such a current to be supplied. Thus if the PMIC of the device does not impose a 100 mA current limit on the USB supply it may actually be able to draw enough current to complete the start-up process.

The ability to set the default USB current limit in NVM means that it is the device manufacturer who can decide on an appropriate default USB current limit, rather than the manufacturer of the PMIC. It also allows the same design of PMIC to be used for different devices which have different start-up current profiles.

It should of course be noted that the description above has discussed the present USB current limits of 100 mA and 500 mA. Future USB specifications may apply different current limits (the proposed USB 3.0 standard suggests an initial current limit of 150 mA should be applied). This embodiment of the invention is not limited to any particular choice of current limit but simply allows the default USB current limit to be determined by appropriate programming of a programmable NVM.

The device manufacturer may therefore choose to program a relatively low USB default current limit into the NVM, for instance he may choose a default USB current limit of 100 mA to accord with the USB 2.0 standard.

Referring back to FIG. 7a the current profile on start-up may have a current spike and this current spike may involve the device requiring more than 100 mA for starting the device.

The current profile illustrated in FIG. 7a, which has a current spike, may be partly due to the need to charge decoupling capacitors and the like when powering previously unpowered power domains. In an embodiment of the invention therefore the start up of at least one power block is performed in a soft-start mode to mitigate the effects of a current spike.

In soft start mode a suitably low current limit is applied to at least one but preferably all power blocks as they are started to try to reduce the maximum current drawn by the device during start up. For power blocks which include a low current LDO regulator, applying a current limit is relatively easy. However for power blocks with a DC-DC type regulator it is very difficult to enforce a current limit which much is lower than the expected operating current of the regulator.

Figure 8A:
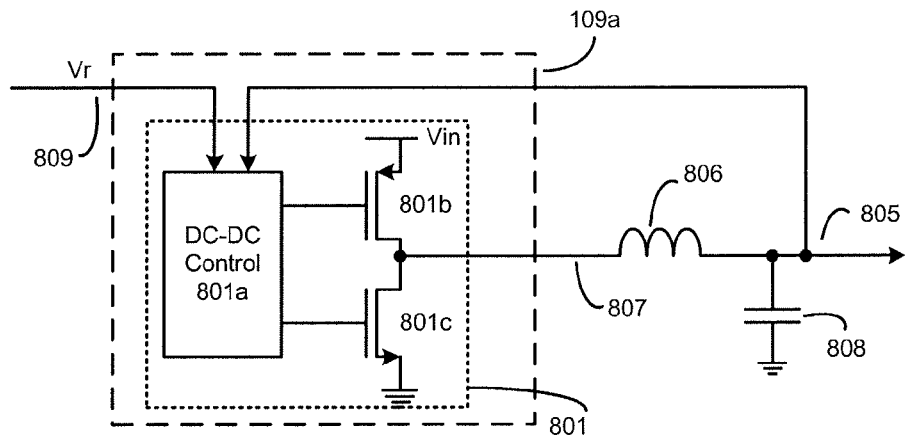
FIG. 8a shows a DC-DC type power block for use in a PMIC.

FIG. 8a shows an embodiment of a regulator, or power regulation circuit or power block, for example power block 109a, for example for use in a PMIC. Power block 109a has circuitry 801 for performing DC-DC Buck type voltage regulation. DC-DC circuitry 801 comprises DC-DC Control circuitry 801a and an output stage comprising an NMOS driver 801c and a PMOS driver 801b. The output from the common node 807 of transistors 801c and 801b is connected through inductor 806 to a reservoir capacitor 808 and output node 805 to which a load may be attached to receive power. Node 805 is also connected to an input of DC-DC Control circuit 801a.

In operation the driver output node 807 will be switched alternately to regulator input voltage Vin or ground by the switches 801b and 801c respectively under control of DC-DC Control circuitry 801a. The substantially square-wave output voltage on 807 is filtered by a series inductor 806 and a load capacitor or reservoir capacitor 808 to produce an output voltage Vout with relatively low ripple content on output node 805. The voltage Vout on node 805 is fed back to an input of DC-DC Control block 801a where it is compared internally to a reference voltage Vr applied to input terminal 809 to produce an error voltage, from which a corresponding duty cycle of conduction is derived and applied to the switches 810b and 801c via their control, i.e. gate, terminals. The negative feedback around the loop comprising these components produces a stable voltage Vout on output node 805 for a certain operating range of current demand of any load (not illustrated) attached to this node.

On start-up, the reservoir capacitor 808 is likely to be discharged, so power block 109a, and in particular high-side driver 801b has to supply current to charge this capacitance, which is likely to be large, in order to adequately smooth the output voltage Vout. The feedback loop is likely to be saturated, i.e. overdriven, and so the PMOS will turn on for most if not all of each cycle, so a high supply current will be drawn from the supply Vin until the capacitor 808 is charged to the nominal output voltage required on Vout or at least near the nominal output voltage. Note there may be further reservoir capacitors distributed around the device, not just local to the power block, so the total capacitance associated with node 805 may be high.

Additional circuitry may be included in DC-DC Control circuitry 801a to serve to limit the supply current passing through 801b or the connection to the inductor, but such a current limit is normally only designed for safety reasons, to prevent damage due to excessive currents, e.g. from a short-circuit to ground applied at the load. To achieve reasonable efficiency, the transistor 801b is likely to have a low on resistance, to drop only a small voltage under maximum loads, which may typically be of the order of 1 A. In principle the current limit could be reduced to reduce the input current, or in-rush current, in start-up but the small resistance of the transistor 801b makes it difficult in practice to implement a current limit at a current value a factor of 10 or more lower, as would be required to guarantee a limit of 100 mA or 25 mA say.

Figure 8B:
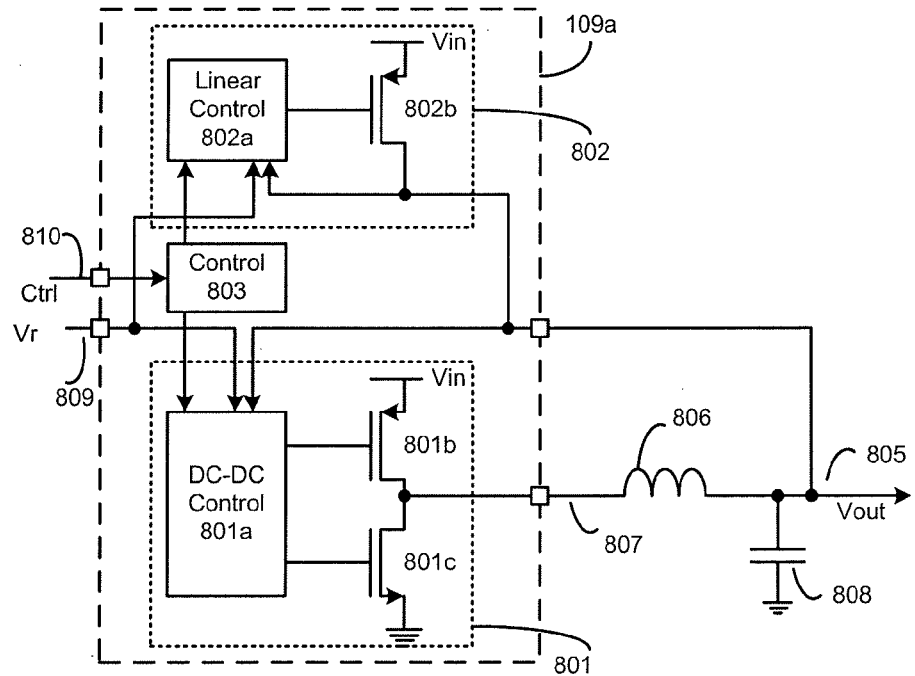
FIG. 8b shows a regulator according to an embodiment of the invention and FIG. 8c shows an alternative embodiment of a regulator.

It would be desirable to have some way of starting up the circuit without suffering too much from inrush current. It should be noted that this problem occurs not only when starting from no power supply state, but actually every time a regulator is enabled if the power source has limited power supply capability, i.e. once the device is active and operating from a USB power supply without a battery, and the USB host is only able to supply 100 mA of current. If a regulator is now started and takes more than 100 mA the device will most likely be reset as the supply voltage drops due to USB power supply overload, Similarly for cases where a step increase in output voltage Vout from one value to another is required FIG. 8b shows an embodiment of a power block, for example an implementation of power block 109a, which provides a soft-start mode, i.e. means for starting up the power block 109a without excessive inrush current. Power block 109a has circuitry 801 for performing DC-DC type voltage regulation and also circuitry 802 for performing linear type voltage regulation. As above DC-DC circuitry 801 comprises DC-DC Control circuitry 801a and output stage NMOS driver 801c and PMOS driver 801b. The output from the common node 807 of transistors 801c and 801b is connected through inductor 806 to a reservoir capacitor 808 and output node 805 to which a load (not illustrated) may be attached to receive power. Node 805 is also connected to an input of DC-DC Control circuit 801a, in which it is compared to applied reference node Vr.

In this embodiment, output node 805 is also attached to a linear regulator, in this embodiment a PMOS-output LDO 802 comprising Linear Control circuitry 802a and output PMOS pass transistor 802b. Node 805 is also connected to an input of Linear Control circuitry 802a, where it is compared to the reference voltage Vr.

Control circuitry 803 serves to select one or other of the DC-DC circuitry 801 or the LDO circuitry 802 with which to drive output node 805.

In DC-DC mode the LDO PMOS 802b will be turned off by Linear Control circuitry 802a, and the output node 805 will be driven via node 807 and inductor 806 by the driver transistors 801b and 801c under control of DC-DC Control circuitry 801a. In LINEAR mode, DC-DC Control circuitry 801a will turn off driver transistors 801b and 801c and the LDO pass device 802b will drive the output node 805 controlled by the Linear Control circuitry 802a.

The Linear Control circuitry 802a imposes an output current limit in the LINEAR mode of operation by further controlling the flow of current through pass transistor 802b. The LDO maximum output current is designed to be lower than the DC-DC maximum output current. Thus 802b will have a higher on-resistance if ever turned fully on and be a smaller device, so it is thus relatively easy to implement a lower value current limit. In other words, a desired low value current limit will be a larger fraction of the lower maximum current. Also the current limit for a continuous output of the LDO is easier to arrange than the necessarily sampled current of a DC-DC converter of variable duty cycle.

The power block may change from LINEAR mode to DC-DC mode based on a control signal. The control signal Ctrl could be generated after a certain period of time or it could be based on the voltage output level of the power block at Vout. For instance the control signal could correspond to a voltage threshold being reached. Alternatively it could be based on a current threshold met by the current delivered by the driver transistor 802b.

Configuration settings could be stored in non-volatile memory associated with the PMIC indicating the mode of operation required on start-up, and used to initialise writeable PMIC registers to define the behaviour on start-up or later.

Thus the PMIC may be configured so that the power block is operated purely in a DC/DC mode upon activation. This may give a faster start-up when there is a high-current supply (e.g. a bulk supply or charged battery) available. Alternatively the power block may be configurable so that the power block may alternatively be operated purely in a LINEAR mode upon activation, for instance if it is known that at least in the initial power state, the power block need only supply a small current, to provide some minimum operation before the device is fully activated. The control input can then be altered later to either DC-DC or LINEAR and back again, e.g. once the device is active, as device operating modes and usage changes.

The embodiments above also provide a solution to mitigate the problem of current surges when the regulator is turned on at other times than start-up from cold. The control input can either be programmed by the processor if active or by sequencing circuitry on the PMIC, possibly configured though NVM or reprogrammable memory or registers, so as to always charge up the reservoir capacitance via the current-limited LDO rather than the DC-DC. The LDO could also be used to avoid high transient input current by assisting in charging up the reservoir capacitor when step increase in the voltage Vout from a low but non-zero level to a higher level is requested, albeit only when the load current will not exceed its current limit. The value of its current limit could be adjusted in operation to achieve this if still possible within the total device supply current available. This could be adjusted digitally on the basis of configuration settings held in registers, possibly pre-loaded from NVM.

Figure 8C:
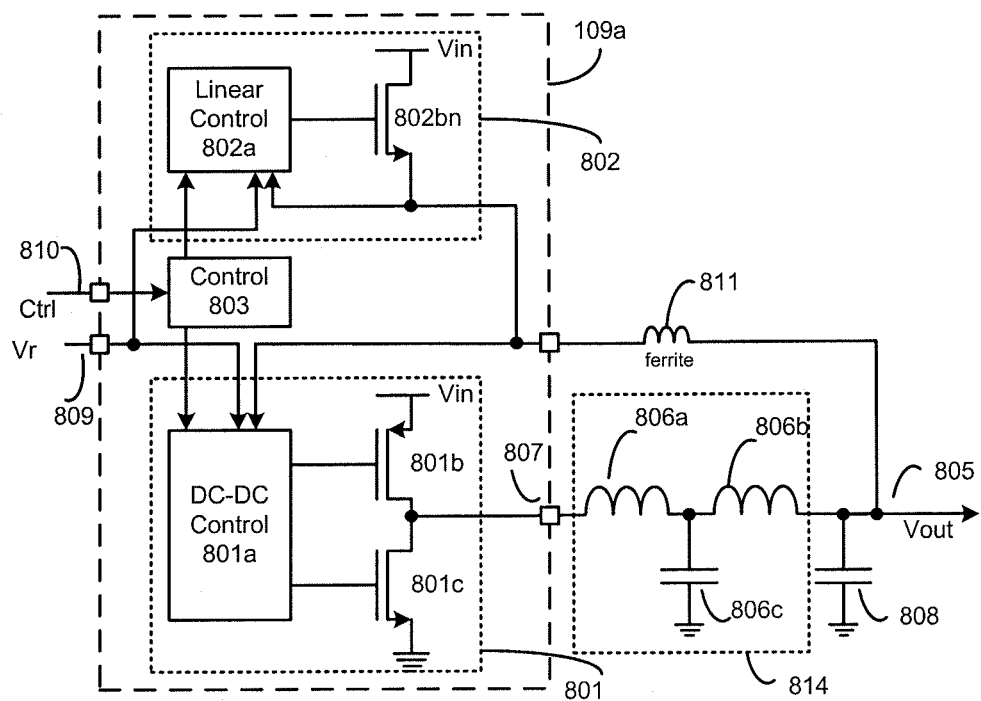

Note the linear regulator directly driving the output node 805 need not be an LDO; it could be a alternative linear regulator, such as the NMOS output regulator with output transistor 802bn shown in FIG. 8c. Filter structures such as 814 shown in FIG. 8c might replace inductor element 806, though for efficiency reasons these are still likely to include an inductor in the path rather than a resistor. There could be a resistor or some inductor or resistor or ferrite bead 811 e.g. for protection reasons in the path from the linear regulator output to the output capacitor. The DC-DC could be some other sort of converter. It is likely to be a Buck converter, since the LDO or other linear regulator can only supply an output smaller than its input supply, but it is conceivable that the LDO supply could be a different, higher-voltage supply than the high-current power source required for the DC-DC, in which case the DC-DC might be a Boost converter, or a Buck-Boost or one of many other topologies.

Further, in soft start mode the PMIC may be arranged to stagger the start up of power domains to reduce the maximum current at any point in time. Whilst some power domains need to be started in a predetermined order to prevent corrupted operation or the like in the device sub-systems some power domains may be enabled at the same time in a start up or boot sequence. If these power domains can be enabled at slightly different times the current draw necessary to charge the power domain may occur at different times and result in a reduced maximum current.

Figure 7B:
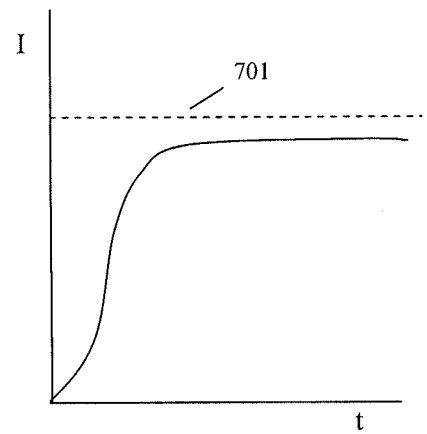

By employing a soft-start up process the current profile during device start up may instead take the form illustrated in FIG. 7b. This may result in a device not exceeding the USB current limit during start up of the device, at least to the stage where the device operating system can take control and negotiate for a higher USB current supply.

Whether or not the PMIC is arranged to power the power domains of the device in a soft-start mode may be configurable and soft-start settings 608 in FIG. 6b indicating whether soft start is required and settings regarding the configurable aspects of soft-start (which power blocks operate in soft-start etc) may be stored in the NVM.

For some devices, whether or not a soft-start of operation is enabled the device may not be able to start up, i.e. transition from a PMIC OFF to a PMIC ON state, with a USB supply alone. The PMIC may therefore be arranged to supplement the USB power supply with power supply from the internal battery such that any shortfall in current from the USB power supply is instead drawn from the battery power supply.

Clearly the battery itself must have sufficient power available to supplement the start up process and hence the PMIC control circuitry may only be arranged to use the battery supply in addition to a USB supply if the battery is above a certain voltage threshold. If the battery is below the required threshold it can't be used to supplement the start up and hence the control circuitry may be arranged to inhibit start-up until the battery has been charged above a certain threshold level.

The PMIC may therefore be operable in a pre-charge mode where the USB supply is used to charge the battery to a level necessary to supplement the USB power supply during the start-up process. The battery threshold above which the battery can be used to supplement the USB power supply during start-up may be configurable and stored in NVM as part of pre-charged mode settings 609 in FIG. 6b.

Further, various different rechargeable batteries exist but commonly Lithium-ion or Lithium-ion polymer batteries are used in portable electronic devices. Such batteries have different safe charging regimes depending on the degree of depletion of the battery charge. For example a Li-ion battery which has been almost fully discharged should initially receive only a gentle charging current to avoid damage to the battery. Once a safe level of charge has been reached, determined by a specified voltage level of the battery, the charging can safely use a greater charging current in a constant current mode regime until a maximum voltage level has been reached. Charging at the gentle trickle charge limit is relatively slow.

The fast charging threshold may also be configurable as part of the pre-charge settings, as different batteries may have different voltage threshold at which fast charging can be commenced.

Whilst the above embodiments have been described in relation to a power management integrated circuit it will be clear that the embodiments of the invention can be applied generally to other forms of power management apparatus. The embodiments of the invention may be useful for power management of any form of electrical device, whether having a single power source or multiple power sources and whether portable or not. The embodiments of the present invention are particularly applicable to portable devices however such as: mobile computing devices such as laptops, netbooks, PDAs and the like; mobile communication devices such as radio telephones, cellular telephone, mobile email devices and he like; personal media players such as mp3 or other audio players, personal radios, video players; portable video game consoles and devices; personal navigation devices such as satellite navigators and GPS receivers, whether in-vehicle or hand-held.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

What is claimed is:

1. A power management integrated circuit for managing power supply of a device comprising:
   an internal non-volatile memory for storing boot settings for the power management integrated circuit;
   a data interface for connecting to an external source of boot settings; and
   control circuitry adapted to, when boot settings are required by the power management integrated circuit,
      in the event that an external source of boot settings is operably connected to the data interface, provide one or more boot configuration settings from the external source of boot settings in preference to any corresponding boot settings stored in the internal non-volatile memory; and
      in the event that no external source of boot settings is operably connected to the data interface, provide any boot settings stored in the internal non-volatile memory,
   said power management integrated circuit being configured to, in use, receive power from a power supply and provide regulated power to at least one power domain of a host device,
   wherein the control circuitry is adapted to determine whether the internal non-volatile memory has been programmed with boot settings and, in the event that an external source of boot settings is not operably connected, to prevent a start-up sequence from occurring if the internal non-volatile has not been programmed with boot settings.

2. A power management integrated circuit as claimed in claim 1 wherein the internal non-volatile memory is a one-time-programmable non-volatile memory.

3. A power management integrated circuit as claimed in claim 1 wherein the control circuitry is arranged to detect whether or not the external source of boot settings is operably connected to the data interface.

4. A power management integrated circuit as claimed in claim 3 wherein the control circuitry is arranged to detect whether or not the external source of boot settings is operably connected to the data interface by detecting an electrical parameter of at least one signal line of the data interface.

5. A power management integrated circuit as claimed in claim 1 wherein the data interface comprises one or more contacts for connecting the external source of boot settings with signal lines on the power management integrated circuit.

6. A power management integrated circuit as claimed in claim 5 wherein the data interface comprises a serial data interface.

7. A power management integrated circuit as claimed in claim 1 wherein the control circuitry is arranged to provide some settings from only the internal non-volatile memory.

8. A power management integrated circuit as claimed in claim 1 wherein the control circuitry is adapted such that some protected boot settings may be provided from the internal non-volatile memory even when an external source of boot settings is operably connected.

9. A power management integrated circuit as claimed in claim 8 wherein settings in the non-volatile memory are used to indicate protected boot settings.

10. A power management integrated circuit as claimed in claim 1 wherein the control circuitry provides the boot settings by loading the boot settings into volatile memory of said power management integrated circuit.

11. A power management integrated circuit as claimed in claim 10 wherein the control circuitry is adapted to load any data from the internal non-volatile memory into the volatile memory and, if an external source of boot settings is operably connected to the data interface, subsequently overwrite at least some of the volatile memory with data from the external source.

12. A power management integrated circuit as claimed in claim 1 further comprising internal non-volatile memory programming circuitry for programming boot settings obtained from the external source into the internal non-volatile memory.

13. A power management integrated circuit as claimed in claim 12 wherein the internal non-volatile memory programming circuitry automatically programs the internal non-volatile memory in response to a programming trigger.

14. A power management integrated circuit as claimed in claim 13 wherein the programming trigger comprises a value of a programming setting in the external source of configuration settings.

15. A power management integrated circuit as claimed in claim 12 wherein the internal non-volatile memory programming circuitry comprises circuitry for supplying power to the internal non-volatile memory for programming.

16. A power management integrated circuit as claimed in claim 1 wherein the power management integrated circuit provides a power supply for powering the external source of boot settings when connected to the data interface.

17. A power management integrated circuit as claimed in claim 1 wherein the boot settings include an initial USB current limit.

18. A device comprising a power management integrated circuit according to claim 17.

19. A device according to claim 18 wherein the device is a portable electronic device.

20. A device according to claim 19 wherein the device is at least one of: a computing device; a laptops; a notebook computer; a PDA; a media player; an MP3 player; a video player; a portable television device; a communication device; a mobile telephone; a mobile email device; GPS devices or a navigation device.

21. A method of obtaining boot settings for a power management integrated circuit comprising an internal non-volatile memory, the method comprising the steps of:
   determining whether an external source of boot settings is available to the power management integrated circuit,
   obtaining boot settings from the external source of boot settings if said external source is available,
   obtaining any boot settings from the internal non-volatile memory if said external source is not available by determining whether the internal non-volatile memory has been programmed with boot settings,
   in the event it is determined that the internal non-volatile memory has not been programmed with boot settings, preventing the power management integrated circuit from completing a start-up sequence,
   wherein the power management integrated circuit is configured to receive power from a power supply and provide regulated power to at least one power domain of a host device.

22. A method as claimed in claim 21 wherein the step of determining whether an external source of boot settings is available comprises the step of determining whether said external source is connected to a data interface of the power management apparatus.

23. A method as claimed in claim 21 wherein the step of obtaining any boot settings from the internal non-volatile memory comprises utilizing data stored in the internal non-volatile memory only if the internal non-volatile memory has been programmed.

24. A method as claimed in claim 21 wherein the method comprises obtaining one or more boot settings from the internal non-volatile memory even when the external source of boot settings is connected.

25. A method as claimed in claim 21 comprising the step of reading the contents of the internal non-volatile memory into a volatile memory and subsequently, if an external source of boot settings is connected, overwriting at least some data in the volatile memory with data obtained from the external source.

26. A method as claimed in claim 21 further comprising an initial step of connecting an external source of boot settings to the power management integrated circuit.

27. A method of testing a device comprising performing the method of claim 26 and programming the external store of boot settings with test boot settings.

28. A method of programming the internal non-volatile memory of a power management integrated circuit comprising performing the method claimed in claim 26 and using the boot settings obtained to program the internal non-volatile memory.

29. A method of starting a device having a power management integrated circuit comprising performing the method as claimed in claim 21 and using any boot settings obtained to configure the power management apparatus.

30. A method of operating a power management integrated circuit comprising an internal non-volatile memory, the method comprising the steps of, on activation of the power management integrated circuit:

connecting an external source of boot settings to the power management integrated circuit;

if the external source of boot settings has a status setting indicating that the boot settings should be programmed into the internal non-volatile memory;

determining whether the external source of boot settings is available to the power management integrated circuit;

obtaining boot settings from the external source of boot settings if said external source is available;

obtaining any boot settings from the internal non-volatile memory if said external source is not available; and using the boot settings obtained to program the internal non-volatile memory, or otherwise:

determining whether the external source of boot settings is available to the power management integrated circuit, obtaining boot settings from the external source of boot settings if said external source is available, obtaining any boot settings from the internal non-volatile memory if said external source is not available; and using any boot settings obtained to configure the power management apparatus, wherein the power management integrated circuit is configured to receive power from a power supply and provide regulated power to at least one power domain of a host device.

* * * * *